United States Patent [19]
Usui et al.

[11] Patent Number: 5,986,820
[45] Date of Patent: Nov. 16, 1999

[54] ZOOM LENS OF THE INNER FOCUS TYPE

[75] Inventors: Fumiaki Usui; Kiyoshi Fukami, both of Kanagawa-ken, Japan

[73] Assignee: Canon Kabushiki Kaisha, Tokyo, Japan

[21] Appl. No.: 09/007,723

[22] Filed: Jan. 15, 1998

Related U.S. Application Data

[62] Division of application No. 08/854,773, May 12, 1997, Pat. No. 5,745,300, which is a continuation of application No. 08/196,459, Feb. 15, 1994, abandoned.

[30] Foreign Application Priority Data

Feb. 17, 1993 [JP] Japan .................................. 5-051447
Jul. 29, 1993 [JP] Japan .................................. 5-207080

[51] Int. Cl.[6] .................................................. G02B 15/14
[52] U.S. Cl. ........................ 359/684; 359/686; 359/676
[58] Field of Search .................................. 359/676, 683, 359/684, 686, 687, 823; 396/79, 81, 89; 348/347; 250/201

[56] References Cited

U.S. PATENT DOCUMENTS

| | | | |
|---|---|---|---|
| 4,848,883 | 7/1989 | Maruyama | 350/427 |
| 5,097,360 | 3/1992 | Fukami et al. | 359/674 |
| 5,136,431 | 8/1992 | Terasawa et al. | 359/684 |
| 5,191,475 | 3/1993 | Terasawa et al. | 359/684 |
| 5,309,284 | 5/1994 | Nakatsuji | 359/687 |
| 5,745,300 | 4/1998 | Usui et al. | 359/684 |

FOREIGN PATENT DOCUMENTS

| | | |
|---|---|---|
| 52-41068 | 10/1977 | Japan . |
| 59-4686 | 1/1984 | Japan . |

*Primary Examiner*—Georgia Epps
*Assistant Examiner*—David N. Spector
*Attorney, Agent, or Firm*—Fitzpatrick, Cella, Harper & Scinto

[57] ABSTRACT

A zoom lens is disclosed comprising, from front to rear a first lens unit of positive refractive power, a second lens unit of negative refractive power for varying the focal length, a third lens unit for compensating for the image shift with zooming, and a fourth lens unit having the image forming function and stationary during zooming, wherein the first lens unit is divided into two or three lens subunits, one of which is moved to effect focusing, and various rules of design are set forth to suppress well the variation of aberrations with focusing.

4 Claims, 19 Drawing Sheets

FIG.5(A)(1)
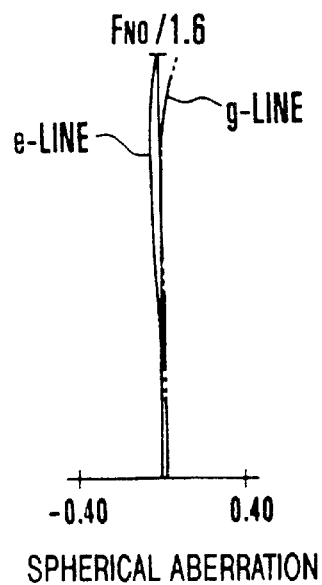
SPHERICAL ABERRATION
FIG.5(A)(2)
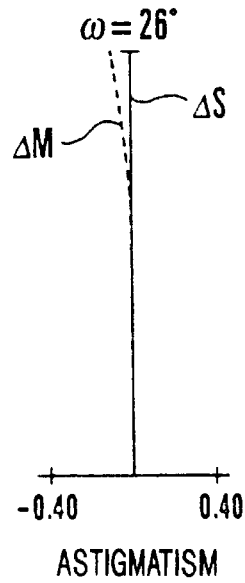
ASTIGMATISM
FIG.5(A)(3)
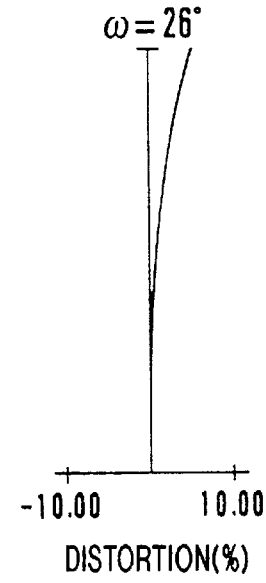
DISTORTION(%)
FIG.5(B)(1)
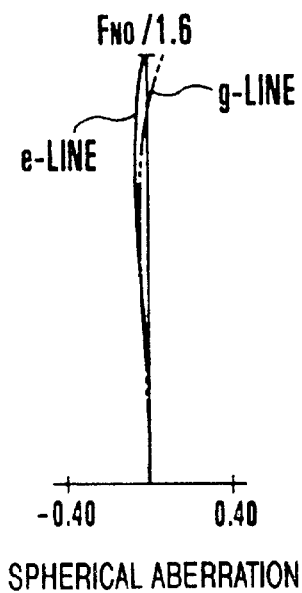
SPHERICAL ABERRATION
FIG.5(B)(2)
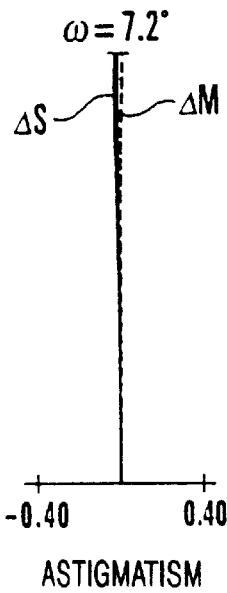
ASTIGMATISM
FIG.5(B)(3)
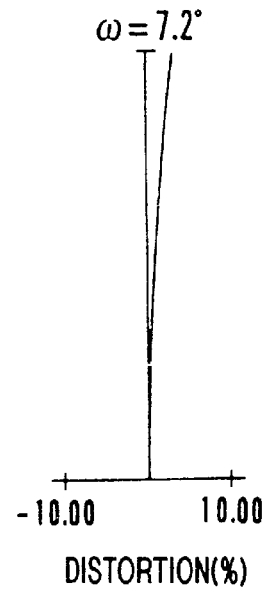
DISTORTION(%)

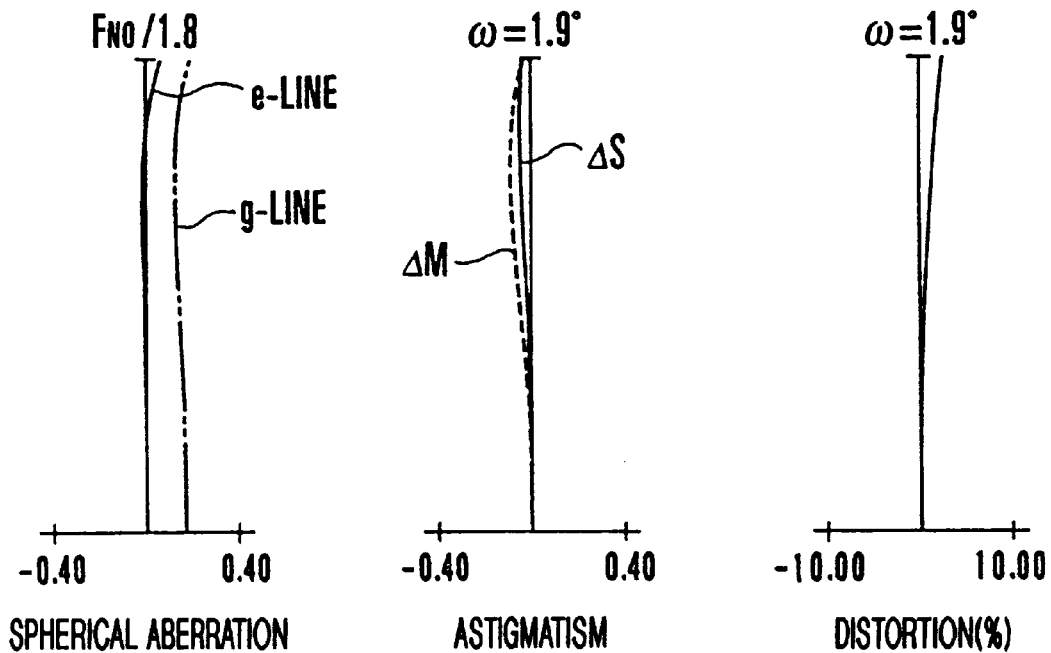
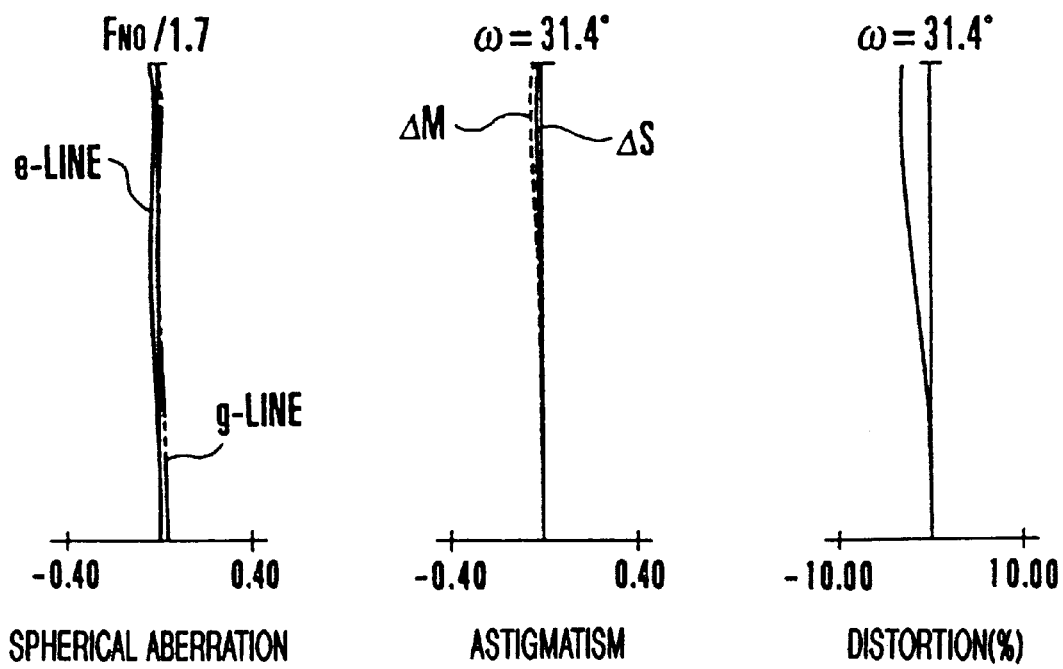

FIG.6(B)(1)
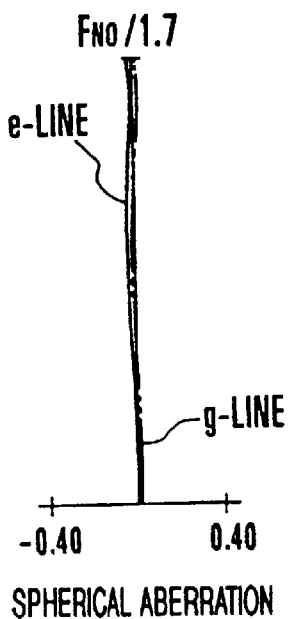
SPHERICAL ABERRATION
FIG.6(B)(2)
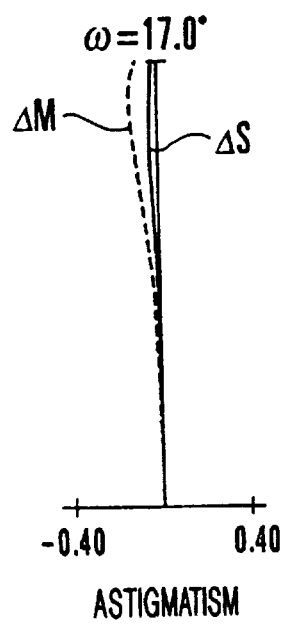
ASTIGMATISM
FIG.6(B)(3)
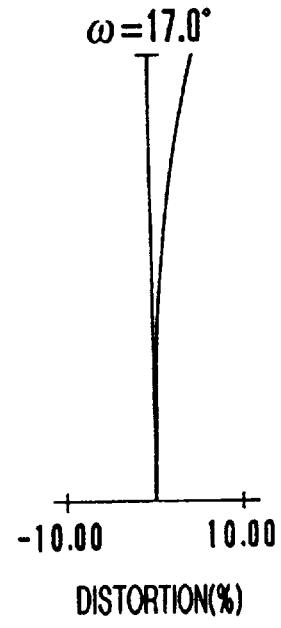
DISTORTION(%)
FIG.6(C)(1)
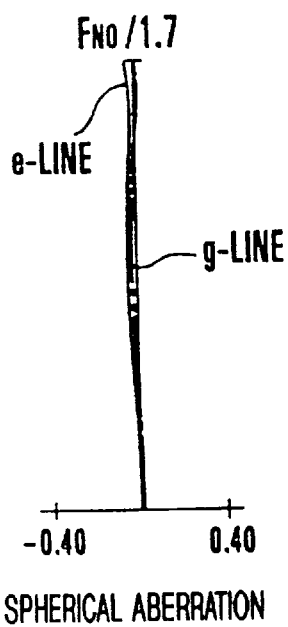
SPHERICAL ABERRATION
FIG.6(C)(2)
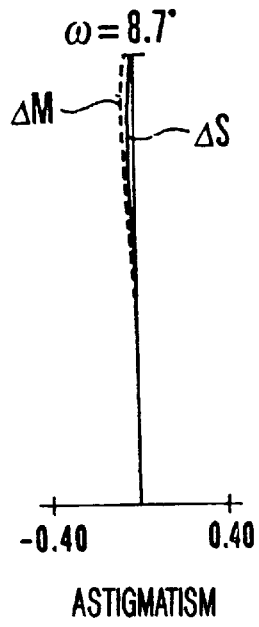
ASTIGMATISM
FIG.6(C)(3)
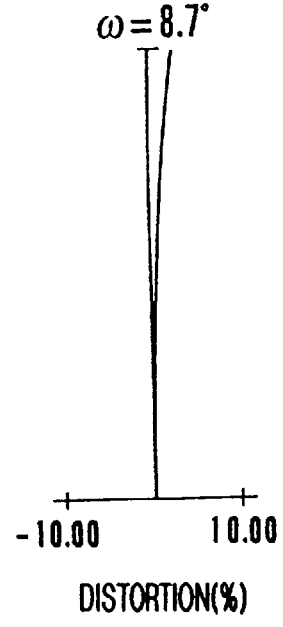
DISTORTION(%)

FIG.6(D)(1)
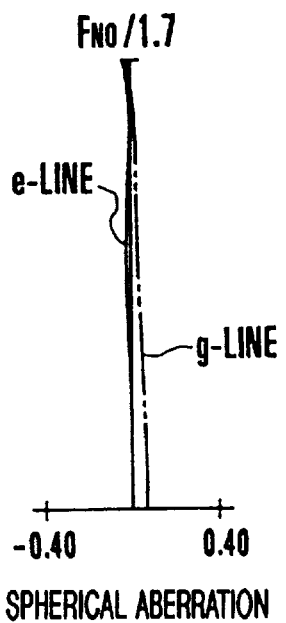
SPHERICAL ABERRATION
FIG.6(D)(2)
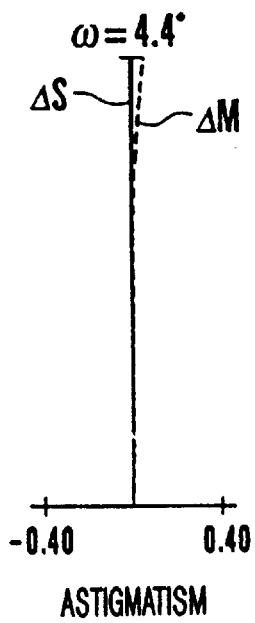
ASTIGMATISM
FIG.6(D)(3)
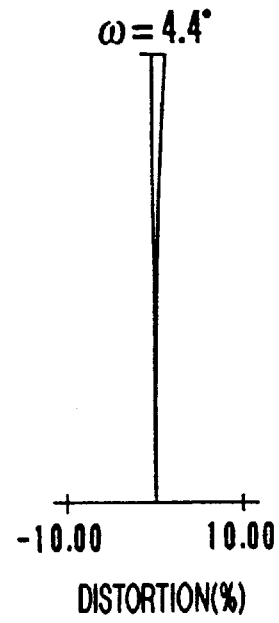
DISTORTION(%)
FIG.6(E)(1)
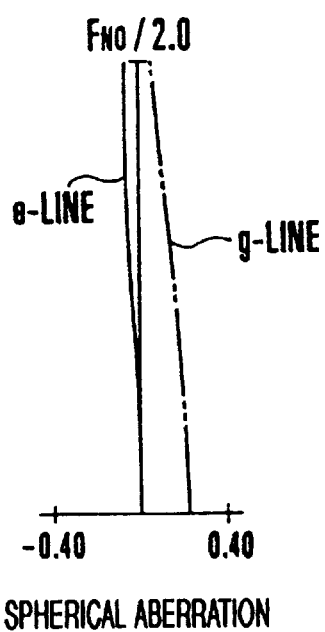
SPHERICAL ABERRATION
FIG.6(E)(2)
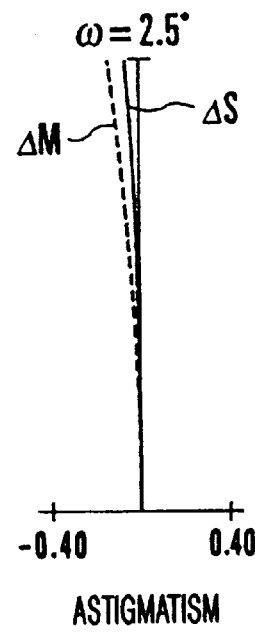
ASTIGMATISM
FIG.6(E)(3)
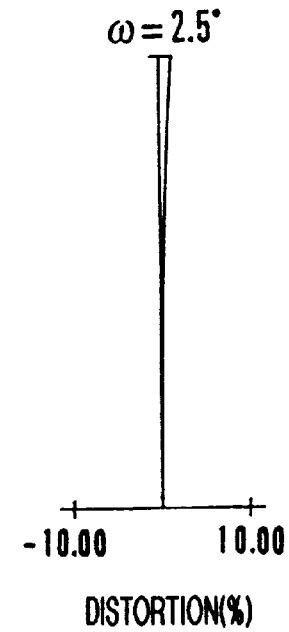
DISTORTION(%)

FIG.7(A)(1)
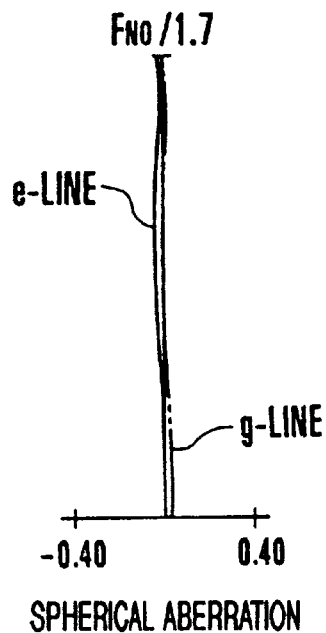
SPHERICAL ABERRATION
FIG.7(A)(2)
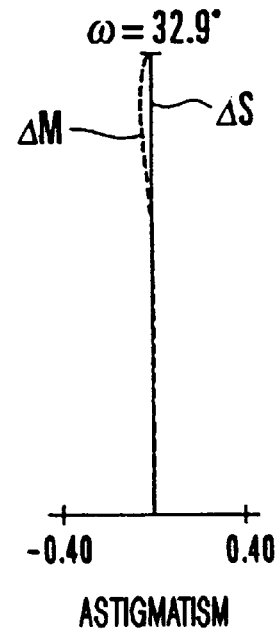
ASTIGMATISM
FIG.7(A)(3)
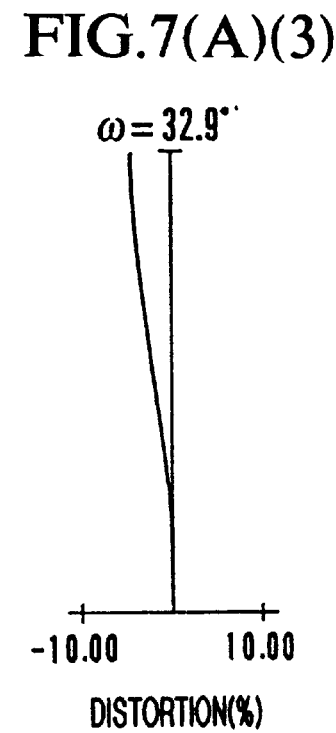
DISTORTION(%)
FIG.7(B)(1)
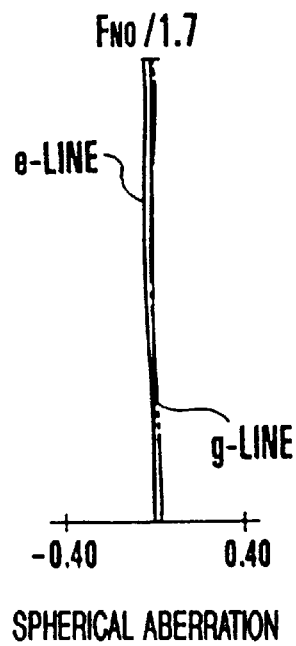
SPHERICAL ABERRATION
FIG.7(B)(2)
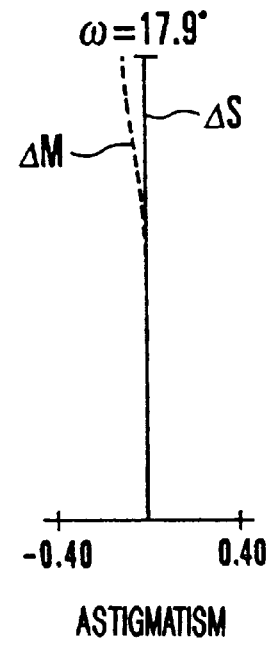
ASTIGMATISM
FIG.7(B)(3)
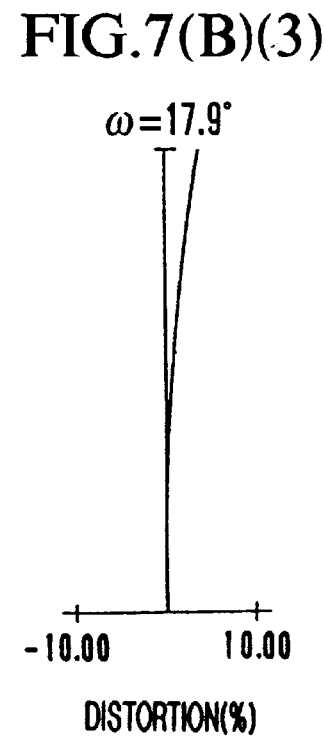
DISTORTION(%)

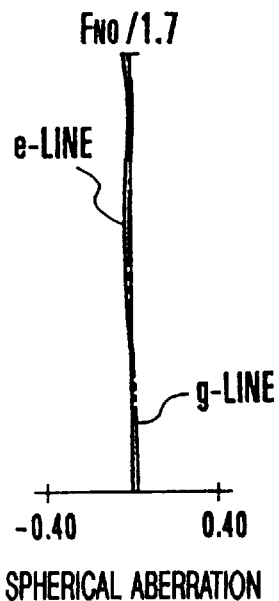
FIG.7(C)(1)
SPHERICAL ABERRATION
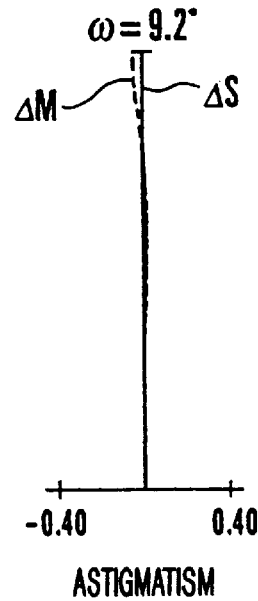
FIG.7(C)(2)
ASTIGMATISM
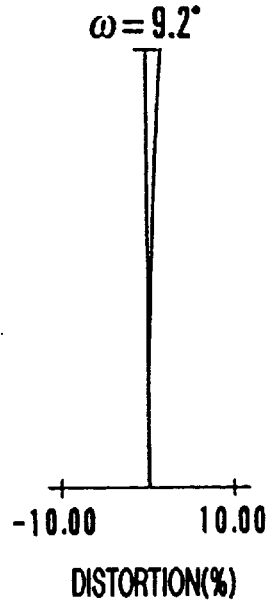
FIG.7(C)(3)
DISTORTION(%)
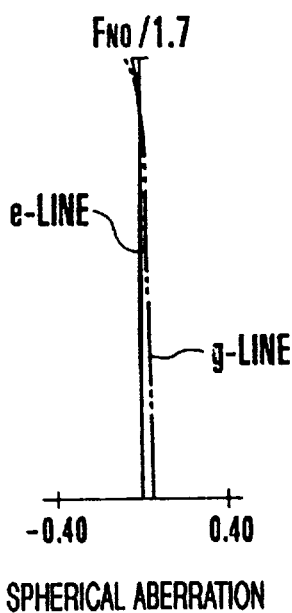
FIG.7(D)(1)
SPHERICAL ABERRATION
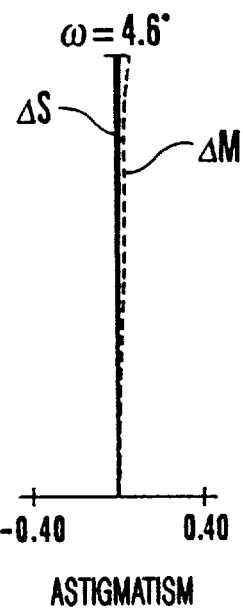
FIG.7(D)(2)
ASTIGMATISM
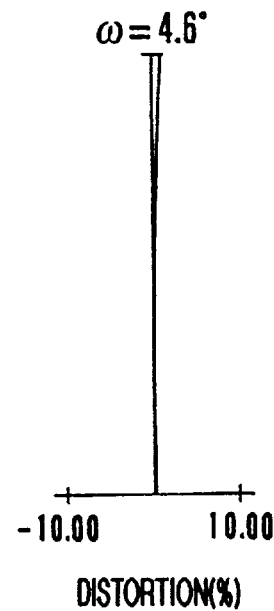
FIG.7(D)(3)
DISTORTION(%)

FIG.7(E)(1)
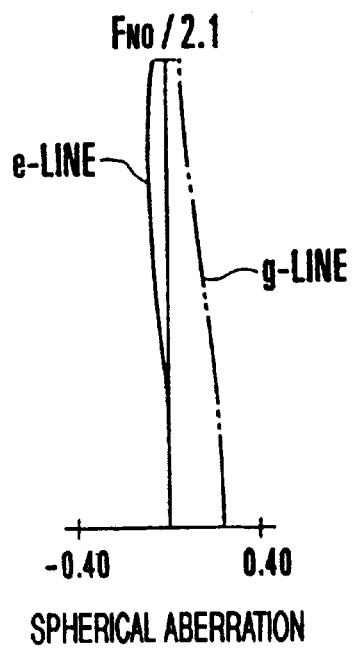
SPHERICAL ABERRATION
FIG.7(E)(2)
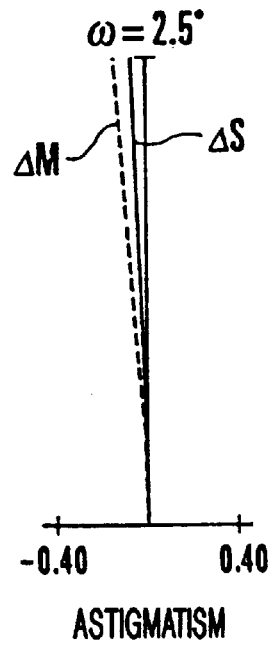
ASTIGMATISM
FIG.7(E)(3)
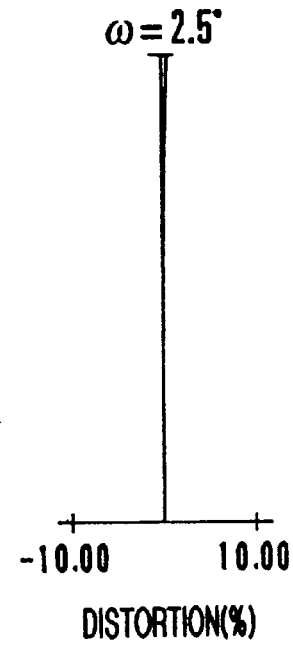
DISTORTION(%)
FIG.8(A)(1)
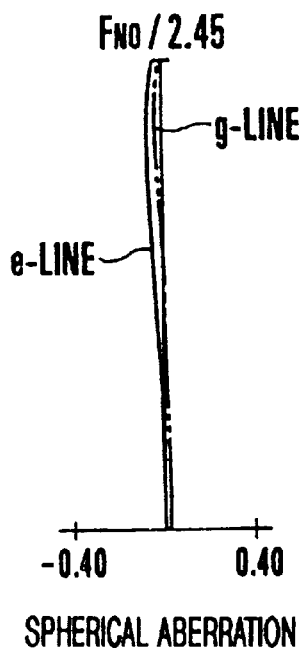
SPHERICAL ABERRATION
FIG.8(A)(2)
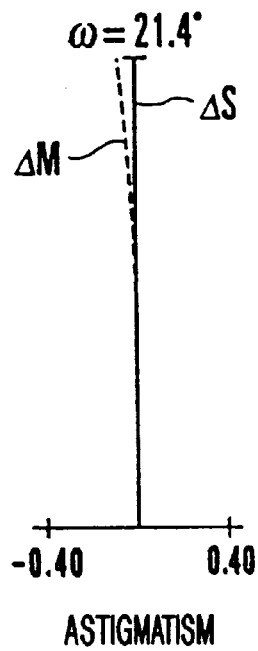
ASTIGMATISM
FIG.8(A)(3)
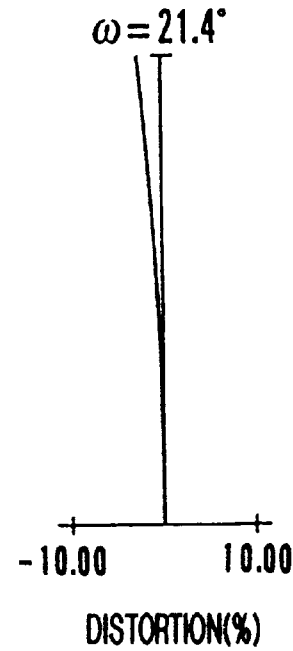
DISTORTION(%)

FIG.8(B)(1)
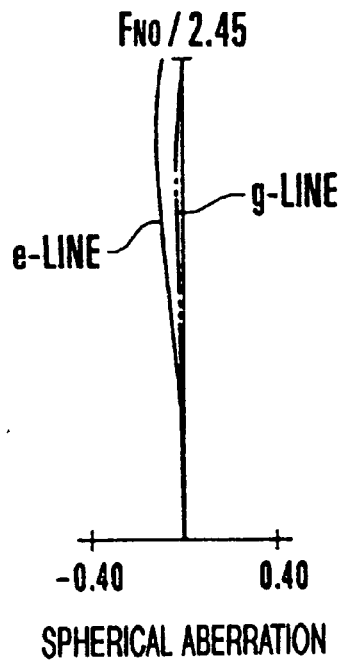
SPHERICAL ABERRATION
FIG.8(B)(2)
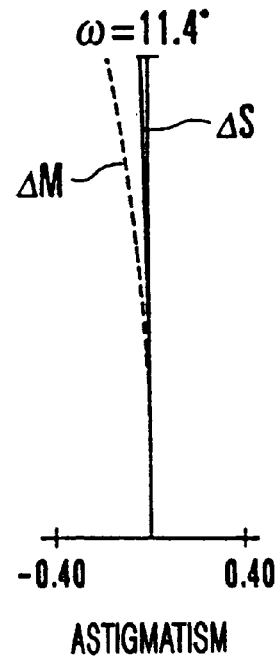
ASTIGMATISM
FIG.8(B)(3)
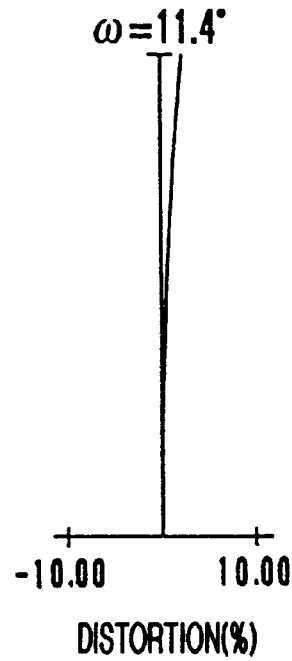
DISTORTION(%)
FIG.8(C)(1)
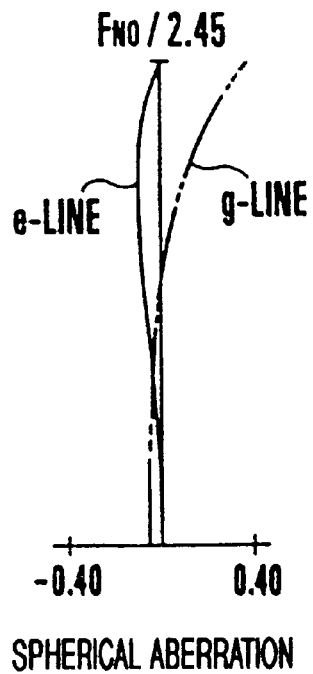
SPHERICAL ABERRATION
FIG.8(C)(2)
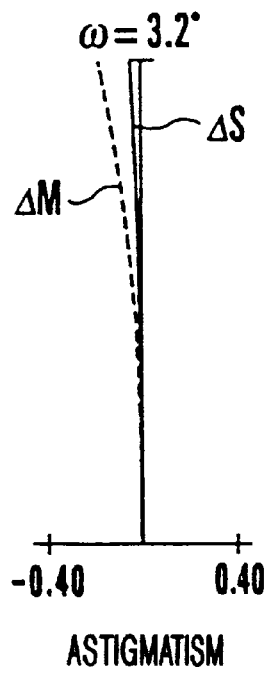
ASTIGMATISM
FIG.8(C)(3)
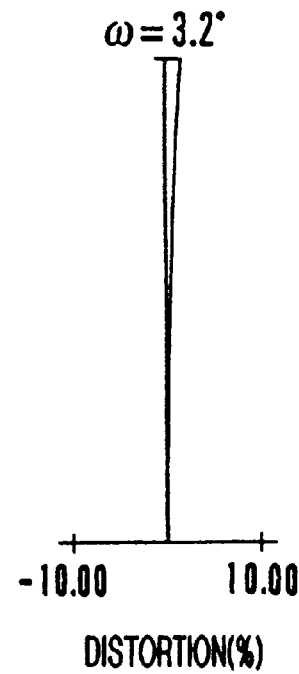
DISTORTION(%)

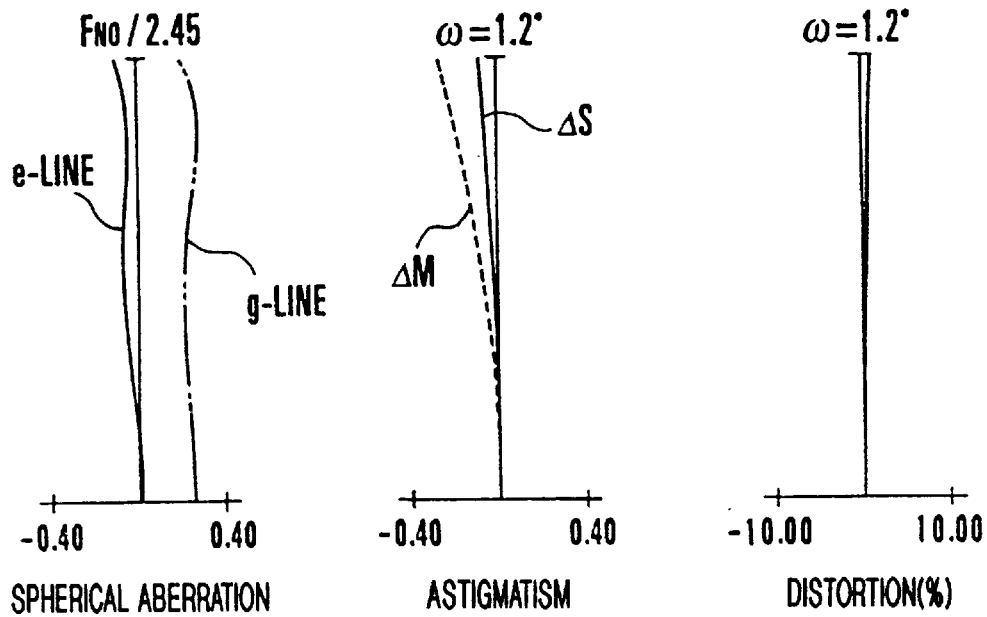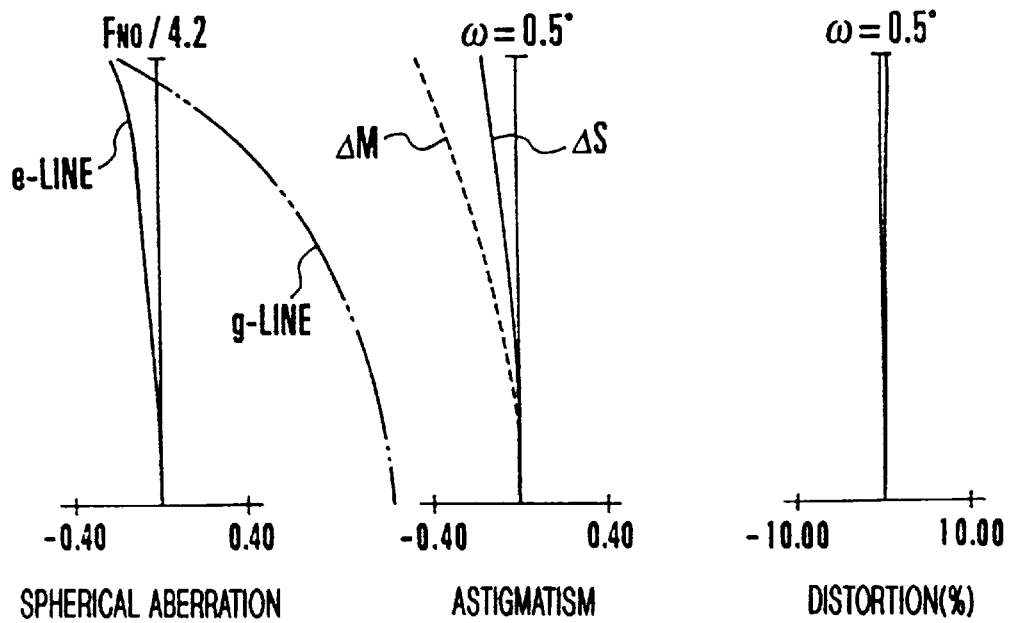

FIG.12(A)(1)   FIG.12(A)(2)   FIG.12(A)(3)
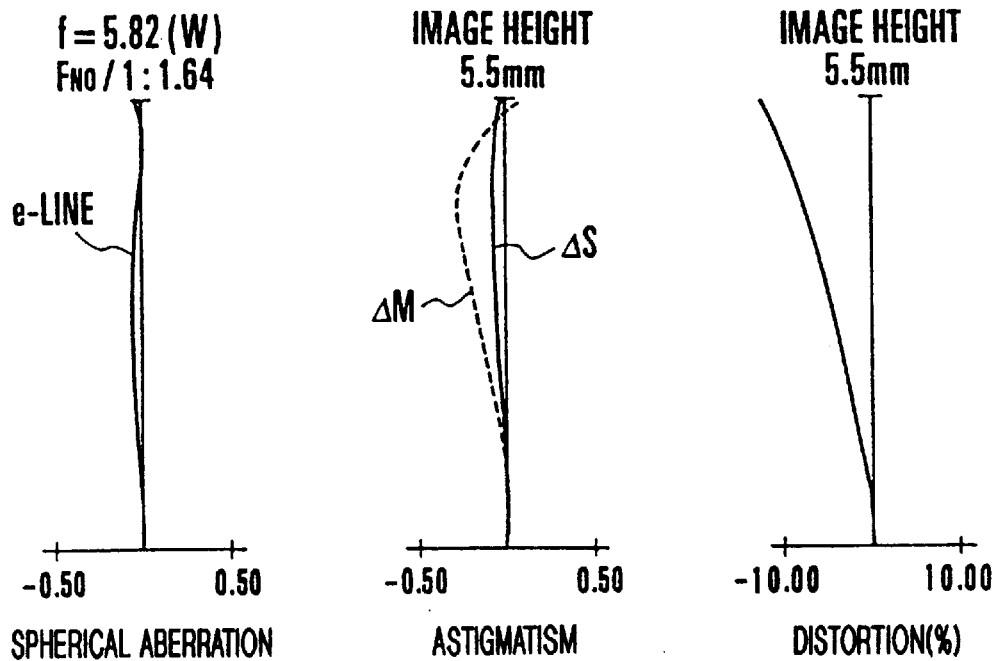
FIG.12(B)(1)   FIG.12(B)(2)   FIG.12(B)(3)
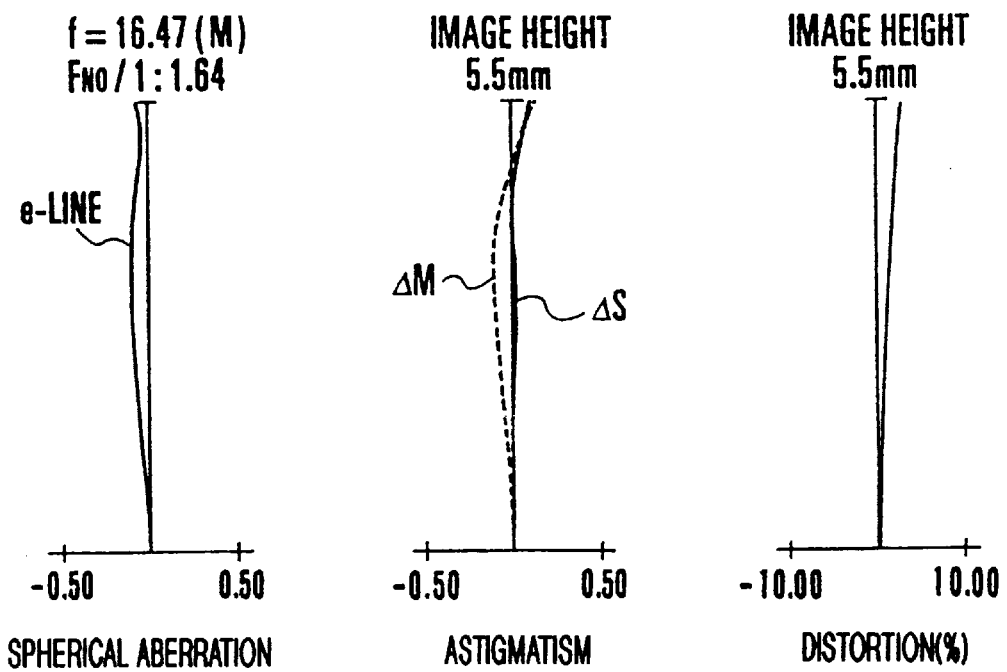

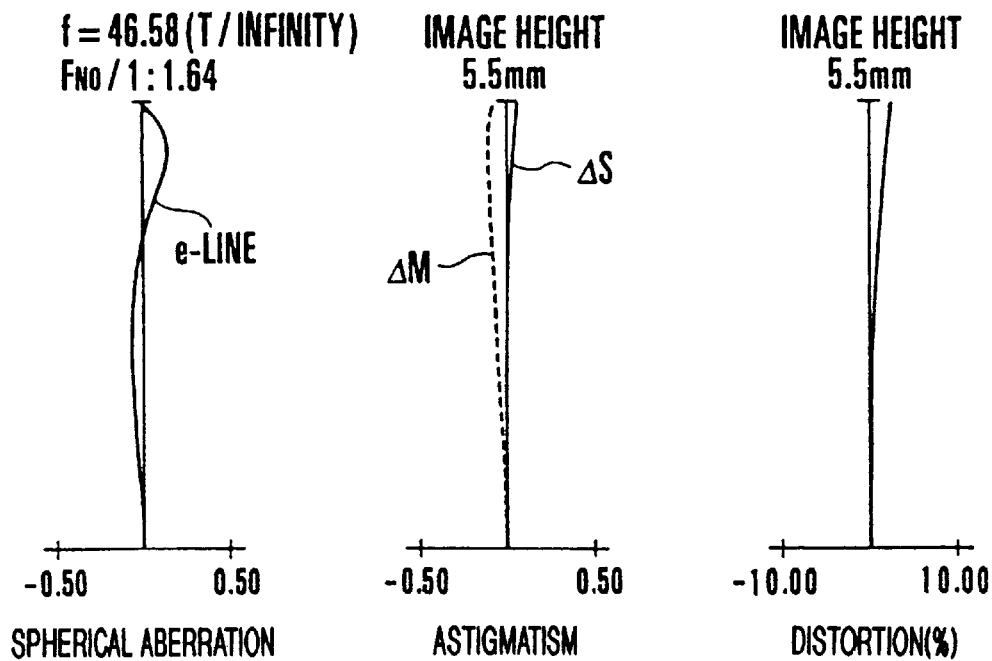
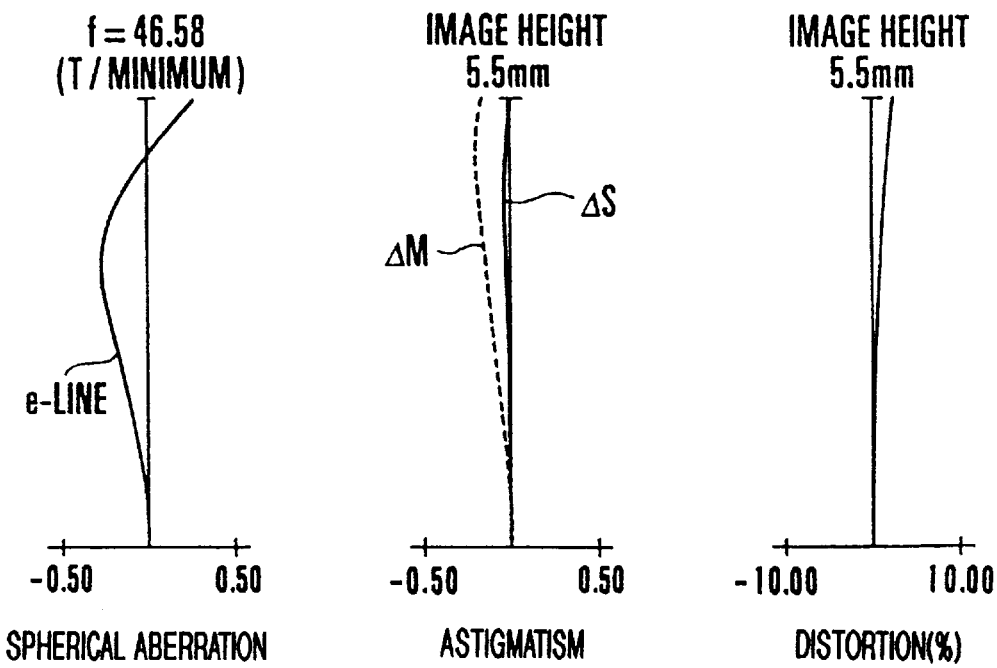

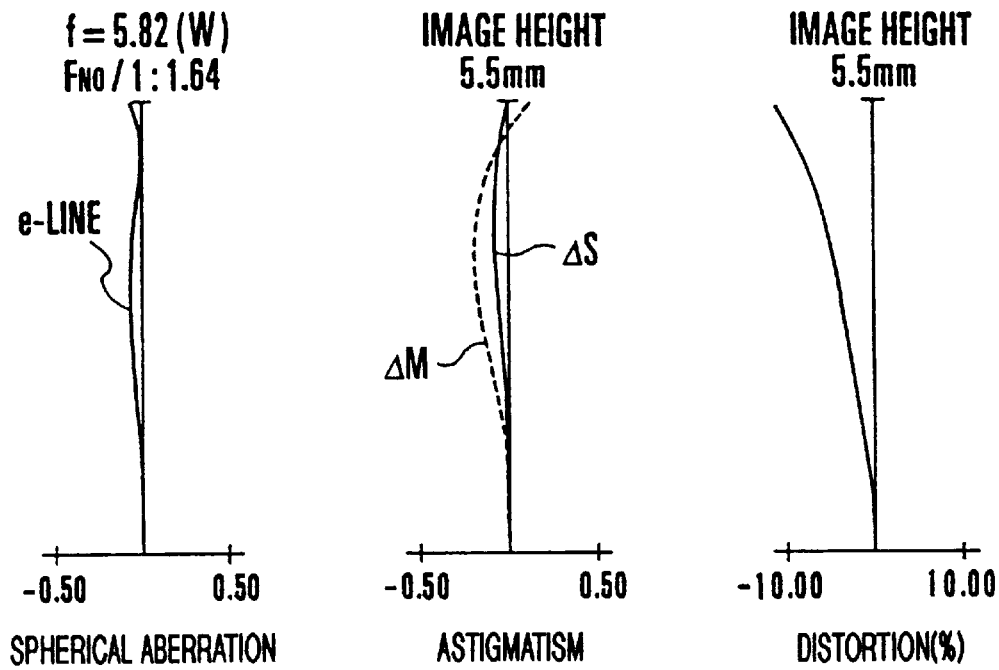
FIG.13(A)(1) FIG.13(A)(2) FIG.13(A)(3)
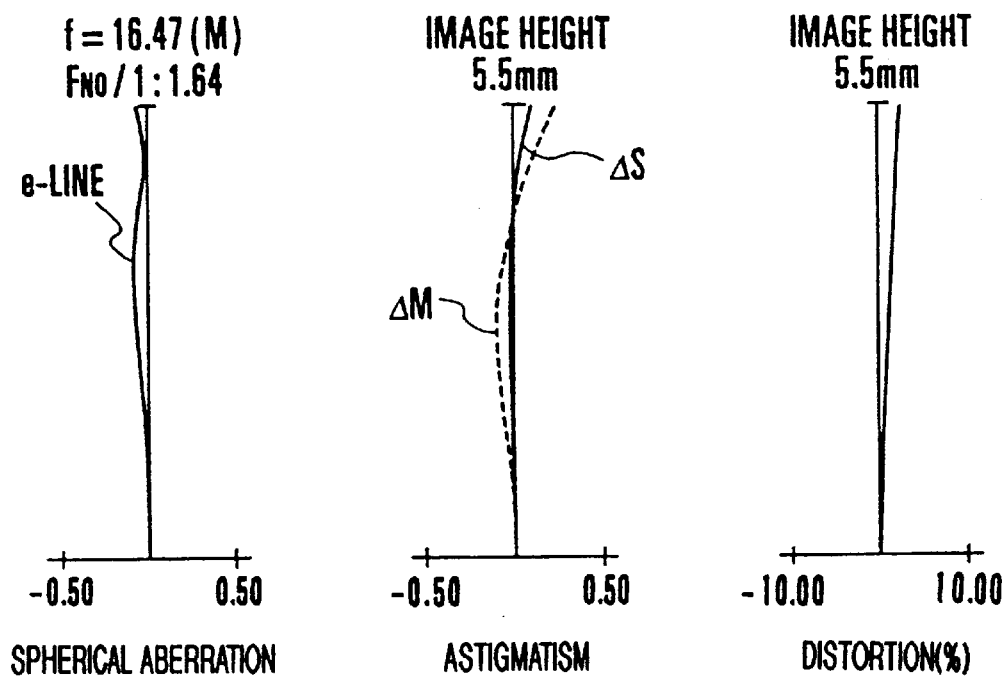
FIG.13(B)(1) FIG.13(B)(2) FIG.13(B)(3)

FIG.13(C)(1)  FIG.13(C)(2)  FIG.13(C)(3)
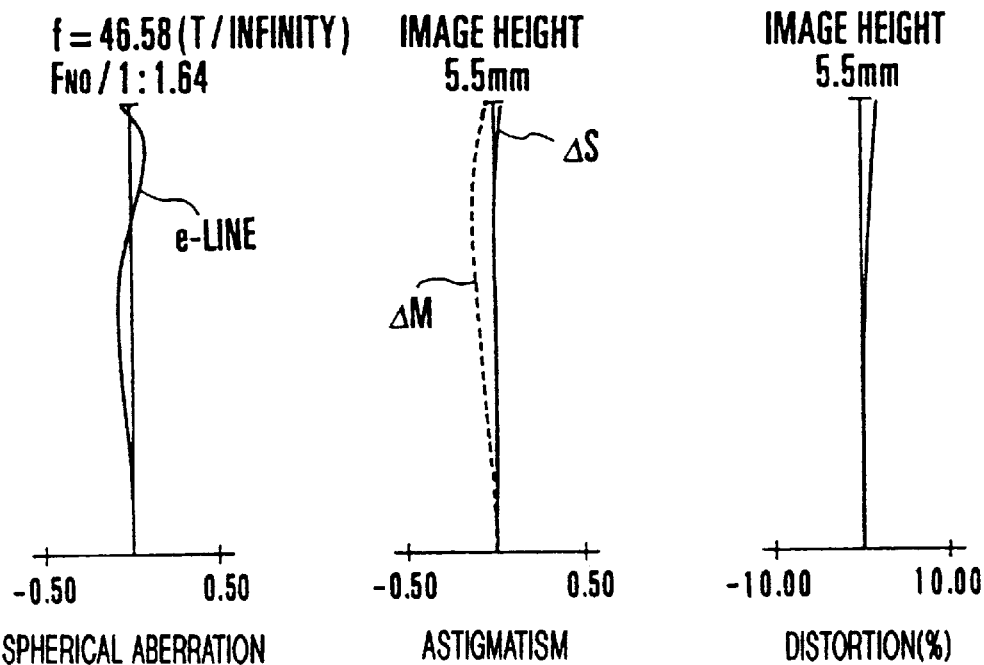
FIG.13(D)(1)  FIG.13(D)(2)  FIG.13(D)(3)
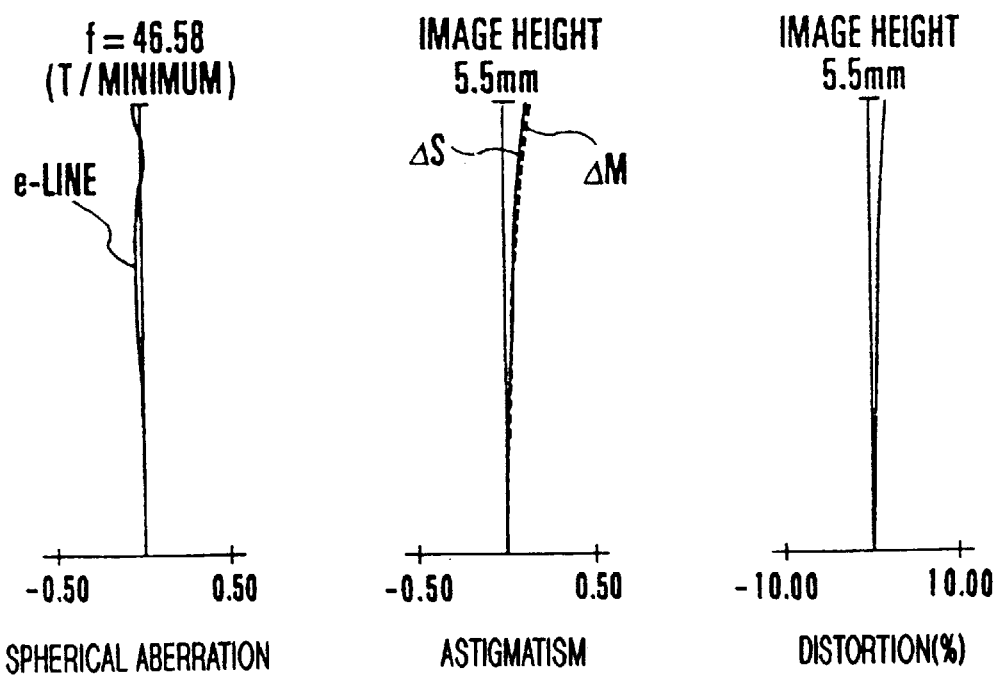

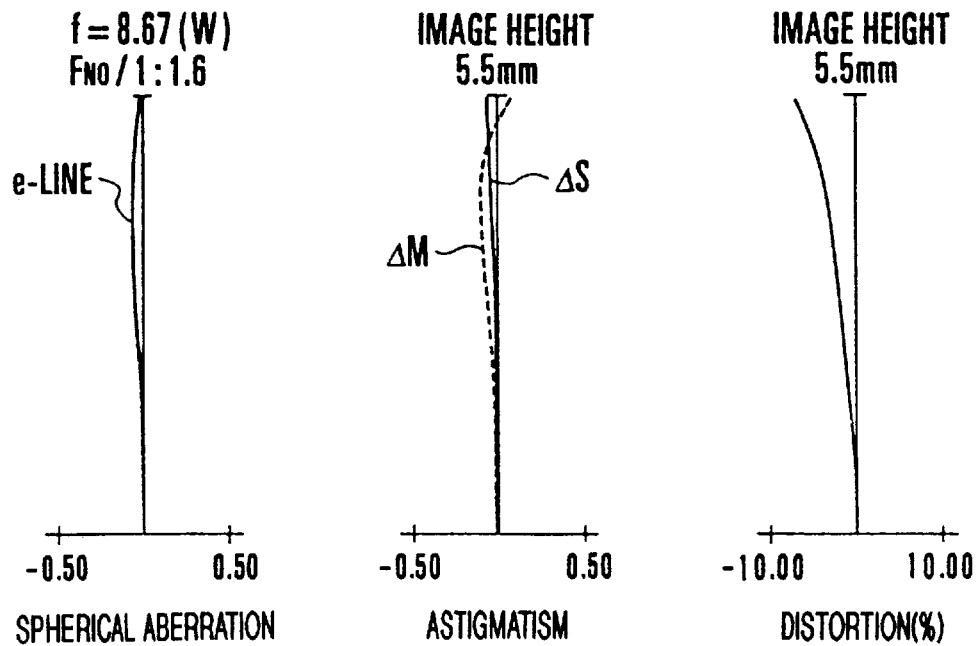
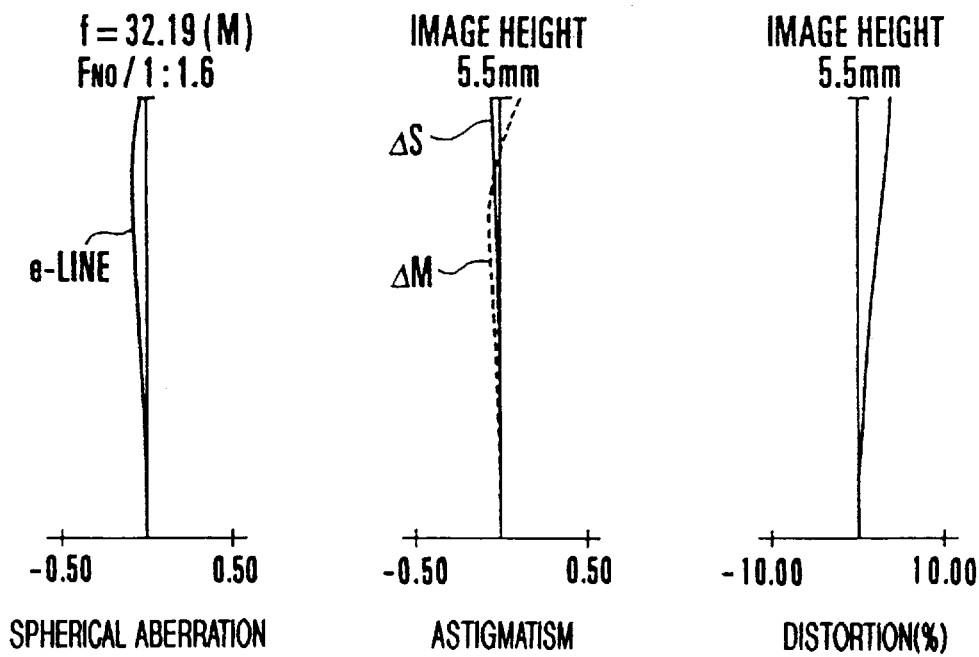

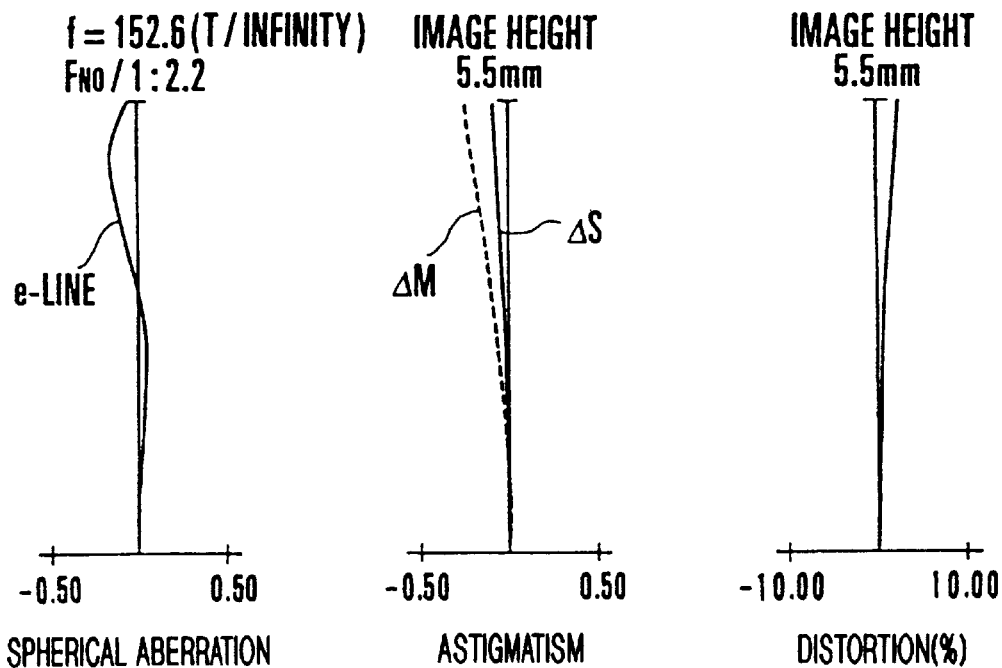
FIG.14(C)(1) FIG.14(C)(2) FIG.14(C)(3)
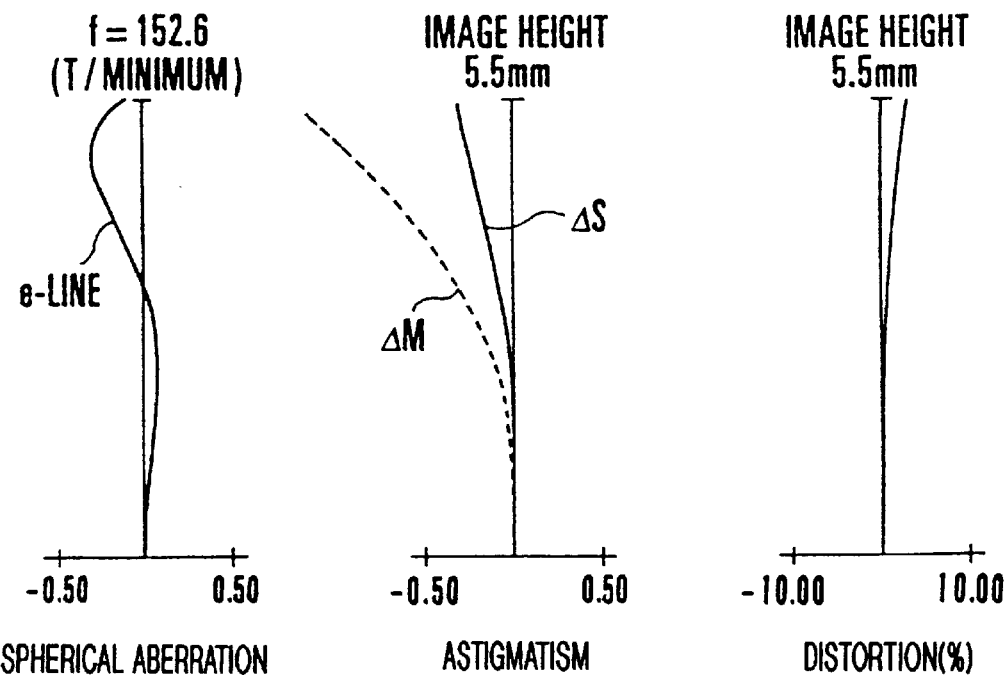
FIG.14(D)(1) FIG.14(D)(2) FIG.14(D)(3)

ZOOM LENS OF THE INNER FOCUS TYPE

This application is a division of Application Ser. No. 08/854,773 filed May 12, 1997, now U.S. Pat. No. 5,745,300, which is a continuation of Application Ser. No. 08/196,459 filed Feb. 15, 1994, now abandoned.

BACKGROUND OF THE INVENTION

1. Field of the Invention

This invention relates to zoom lenses suited to television cameras, photographic cameras, or video cameras and, more particularly, to large relative aperture, high range zoom lenses whose F-number for the wide-angle end is 1.6 and whose range is 8 to 44, wherein good stability of high optical performance is maintained over the entire focusing range, as focusing is performed by a lens subunit constituting part of the first lens unit, or by employing the so-called inner focus type.

2. Description of the Related Art

In the recent state of art of color television cameras for broadcasting, quick and easy handling and good manageability are regarded as important. To meet such a demand, even the image pickup devices are reduced in size. So, the use of CCD (solid-state image sensor) of reduced size of, for example, ⅔, or ½ inch has been coming to be the mainstream. By this, it is then insured to minimize the bulk and size of the whole camera apparatus.

In response to this demand, another measure has been taken to the zoom lens for use in the color television camera for broadcasting by reducing its size and weight. At the same time, the capabilities of the zoom lens are heightened.

Of the zoom lens types, one comprising, from front to rear, a focusing or first lens unit of positive refractive power, a second lens unit of negative refractive power for varying the focal length, a third lens unit of positive or negative refractive power for compensating for the image shift with zooming and a fourth lens unit of positive refractive power for forming an image, or the so-called 4-unit zoom lens, has found its use in many color television cameras for broadcasting, since it is comparatively easy to increase the zoom ratio and the relative aperture.

In recent development of zoom lenses for broadcasting, there are strong demands for shortening the focal length in the wide-angle end, or elongating the focal length in the telephoto end, and for increasing the zooming range. In addition to these, how much ahead of the television camera a close object to be shot may take its place has come into consideration. In the zoom lens that is adapted to be used in the television camera for broadcasting, therefore, a shortening of the so-called MOD (Minimum Object Distance) is becoming one of the important factors on the design specification and also on picture effects.

However, if one attempts to shorten this MOD, the variation with focusing of all aberrations becomes a serious problem. Particularly in spherical aberration, astigmatism and chromatic aberrations, the variation gets larger, causing the optical performance to be lowered extremely. With regard to this result of aberration variation by focusing, the longer the focal length and the smaller the F-number, or the faster the lens system and the shorter the MOD, the more prominent the aberration variation becomes. For this reason, many technical ideas have been made in the method of focusing the zoom lens.

Of the focusing types, there is one in which the focusing provision is made, not in the front or first lens unit, but in an inner portion of the lens system, or the so-called "inner focus" type. Using this type, many proposals have previously been made.

Such an inner focus type zoom lens is exemplified in, for example, Japanese Patent Publication No. Sho 52-41068, as obtained by applying it to the socalled 4-unit zoom lens that comprises, from front to rear, a first lens unit of positive refractive power, a second lens unit of negative refractive power for varying the focal length, a third lens unit of negative refractive power for compensating for the image shift with zooming and a fourth lens unit of positive refractive power. In this case, the first lens unit is made movable in part on the image side as a lens subunit for focusing.

Meanwhile, Japanese Patent Publication No. Sho 59-4686 discloses a technique that the first lens unit is divided into three lens subunits, of which the first is negative in refractive power, the second is positive, and the third is positive, wherein as focusing goes from an infinitely distant object to an object at the minimum distance, the second lens subunit is moved toward the image side.

In general, the zoom lenses of the inner focus type have features that, as compared with that type of zoom lens which moves the first lens unit as a whole, the effective diameter of the first lens unit gets small, it becomes easy to minimize the size of the entire lens system, and close-up photography, particularly photomacrography, becomes easy to do, and further quick focus adjustment becomes possible, because the lens unit for focusing is relatively small in size and light in weight, so that a weaker force is sufficient to drive the focusing lens unit.

However, an adverse effect is caused so as to increase the variation with focusing of aberrations, particularly spherical aberration in the telephoto end, giving rise to a very difficult problem of obtaining high optical performance maintained stable over the entire focusing range with the limitation of the size of the entire lens system to a minimum.

FIG. 15 and FIG. 16 are schematic diagrams used to explain such variation with focusing of spherical aberration in the telephoto end.

In FIGS. 15 and 16, the 4-unit zoom lens has its first lens unit F made constructed with a first lens subunit F11 of negative refractive power, a second lens subunit F12 of positive refractive power and a third lens subunit F13 of positive refractive power, totaling three lens subunits, wherein the second lens subunit F12 is moved to effect focusing.

When focused on an infinitely distant object, the first lens unit F and a second lens unit V take a paraxial power arrangement as shown in FIG. 15.

In this figure, a light beam RL1 is axial at the F-number in the telephoto end, and another light beam with a principal ray RL2 comes from the maximum angle of view-field in the wide-angle end.

With the axial light beam in the telephoto end, whilst when focused on an infinitely distant object, it travels as shown by RL3 in FIG. 16, and when focused on an object at the minimum distance, it changes to a light beam RL4.

As is apparent from FIG. 16, the height of incidence on the first lens subunit F11 is lower, and the height of incidence on the second lens subunit F12 is higher when on an object at the minimum distance than when on an infinitely distant object. For this reason, the spherical aberration varies in the negative direction as focusing goes down.

Here, to assure reduction of the size of the first lens unit F, as is understandable from FIG. 15, there is need to minimize the outer diameters of the first and second lens subunits F11 and F12 in order to admit of the principal ray RL2 of the maximum angle of field coverage in the wide-angle end.

To this end, it is necessary either to reduce the inclination of the principal ray of the maximum angular field in the travel from the third lens subunit F13 to the second lens subunit F12, or to put the rear principal point of the first lens unit F to a more rearer position so as to reduce its spacing with the variator V. The height of incidence is thus lowered.

This could be achieved if the refractive power of the third lens subunit F13 were strengthened. However, at the same time, the degree of divergence of the $F_{NO}$ ray in the telephoto end would be caused to increase, as can be seen from FIG. 15.

Further, if one attempts to shorten the minimum object distance, an increased total movement of the second lens subunit F12 results. To allow this, the separation between the second and third lens subunits F12 and F13 for an object at infinity is necessarily increased greatly. Hence, much reduction of the size would become even more difficult to perform.

Since, as described above, the simultaneous fulfillment of the requirements of reducing the size and of shortening the minimum object distance results in an increase of the divergence of the $F_{NO}$ ray for the telephoto end in between the second and third lens subunits F12 and F13, and an increase of the total focusing movement of the second lens subunit F12 at once, the heights of incidence of the rays of FIG. 16 on either of the first and second lens subunits F11 and F12 differ more greatly from each other, with the result that the spherical aberration in the telephoto end varies to a far larger extent with focusing.

Referring again to the above-mentioned Japanese Patent Publication No. Sho 52-41068, the focusing method proposed herein does not always make sure that the lens configuration is adequate for zoom lenses for broadcasting under the demands of high specifications such as large relative aperture, high zoom ratio, short MOD, etc. Particularly with the first lens unit, the shares of its refractive power between the focusing and stationary parts thereof, and the values of dispersion of the glasses of the constituent lens elements are not always sufficiently suited to the high class of zoom lens for broadcasting.

In general, to achieve fulfillment of the recent user's demand, that is, heighten the specifications of the zoom lens in such a manner that the bulk and size and the weight of the entire system are minimized, it is necessary to set forth proper features for the refractive power of all of the lens units and the construction and arrangement of the constituent lenses. Particularly in designing a 4-unit zoom lens, since the first lens unit most affects the bulk and size and the weight of the entire lens system, the proportion of the refractive power it shares, and its speed are important factors. What balance of them to make relative to the whole zoom lens becomes an important element of decision.

Furthermore, to obtain high optical performance throughout the entire focusing range, variation with focusing of aberrations must be suppressed. Of these, spherical aberration and chromatic aberrations vary to the largest extent with focusing. If the variation of these aberrations fails to be as far suppressed as possible, good image quality can no longer be obtained. For this reason, how to make the focusing lens unit and the stationary lens units share aberrations and contribute to achromatism becomes another important element.

SUMMARY OF THE INVENTION

A first object of the present invention is to improve the zoom lens of the inner focus type in which a part of the first lens unit, when counted from the object side, is moved to effect focusing.

Another object is to provide a zoom lens well corrected out of the variation of aberrations particularly with variation of the object distance.

BRIEF DESCRIPTION OF THE DRAWINGS

FIGS. 5(A)(1) to 5(C)(3) are graphic representations of the aberrations of the numerical example 1 of the invention.

FIGS. 6(A)(1) to 6(E)(3) are graphic representations of the aberrations of the numerical example 2 of the invention.

FIGS. 7(A)(1) to 7(E)(3) are graphic representations of the aberrations of the numerical example 3 of the invention.

FIGS. 8(A)(1) to 8(E)(3) are graphic representations of the aberrations of the numerical example 4 of the invention.

FIGS. 12(A)(1) to 12(D)(3) are graphic representations of the aberrations of the numerical example 5.

FIGS. 13(A)(1) to 13(D)(3) are graphic representations of the aberrations of the numerical example 6.

FIGS. 14(A)(1) to 14(D)(3) are graphic representations of the aberrations of the numerical example 7.

In the aberration curves, e stands for the spectral e-line, Δ S for the sagittal image focus, and Δ M for the meridional image focus.

DETAILED DESCRIPTION OF THE PREFERRED EMBODIMENTS

Figure 1:
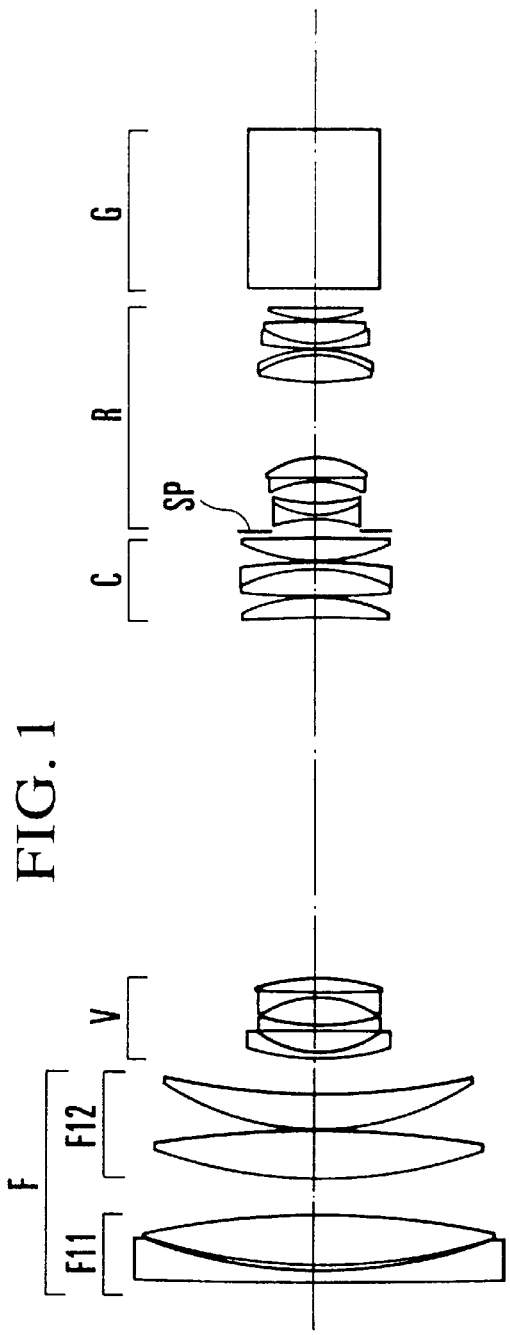
FIG. 1 is a lens block diagram of a numerical example 1 of the invention.
Figure 2:
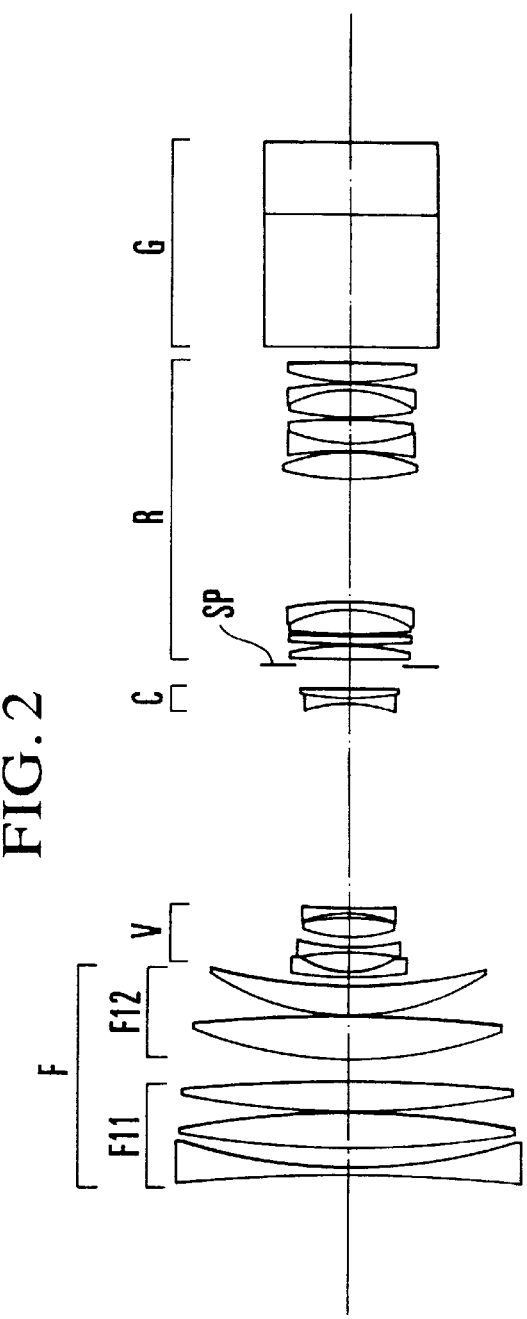
FIG. 2 is a lens block diagram of a numerical example 2 of the invention.
Figure 3:
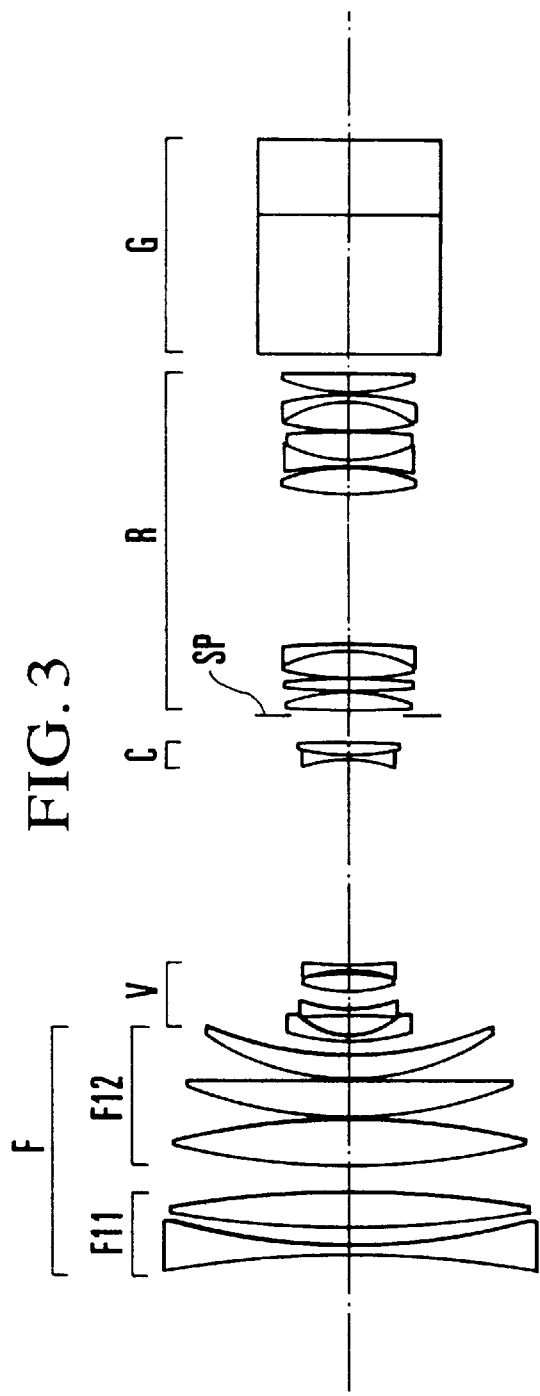
FIG. 3 is a lens block diagram of a numerical example 3 of the invention.
Figure 4:
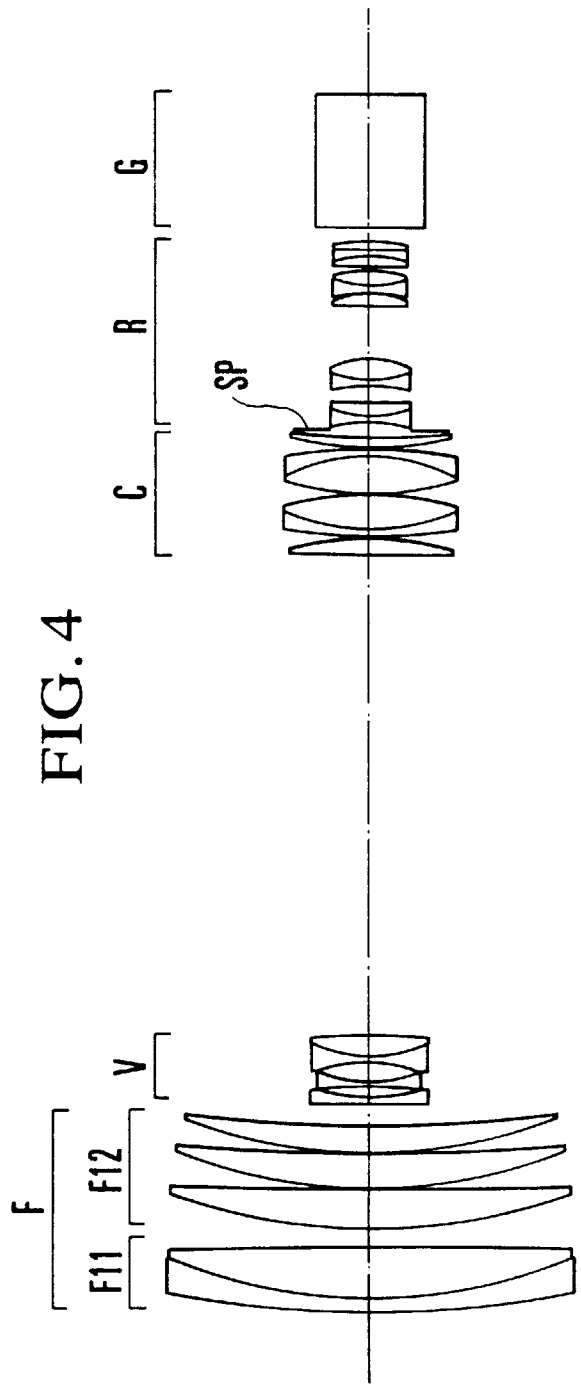
FIG. 4 is a lens block diagram of a numerical example 4 of the invention.

FIGS. 1 to 4 in block diagrams show the numerical examples 1 to 4 of zoom lenses of the invention in the wide-angle end. The aberrations of the zoom lens of FIG. 1 are shown in FIGS. 5(A)(1) to 5(C)(3). The aberrations of the zoom lens of FIG. 2 are shown in FIGS. 6(A)(1) to 6(E)(3). The aberrations of the zoom lens of FIG. 3 are shown in FIGS. 7(A)(1) to 7(E)(3). The aberrations of the zoom lens of FIG. 4 are shown in FIGS. 8(A)(1) to 8(E)(3).

In FIGS. 1 to 4, F denotes a front or first lens unit of positive refractive power comprising a fixed front lens subunit F11 and a rear lens subunit F12 of positive refractive power movable for focusing, totaling two subunits. The front lens subunit F11 has at least one negative lens LN11 and at least one positive lens LP12. These two lenses are independent of each other (or not cemented together.) The rear lens subunit F12 has at least two positive lenses and axially moves toward the object side to effect focusing from an infinitely distant object to an object at the minimum distance.

V denotes a second lens unit for varying the focal length, or a variator, of negative refractive power. Zooming from the wide-angle end to the telephoto end is performed by moving the second lens unit V axially toward the image side monotonously. The second lens unit V varies its magnification in a range that includes −1×.

C denotes a third lens unit or a compensator of positive or negative refractive power movable for compensating for the image shift with zooming. SP stands for a stop, and R stands for a relay lens unit as a fourth lens unit of positive refractive power. G denotes a color separation prism and optical filters shown as a glass block in FIGS. 1 to 4.

In general, the 4-unit zoom lens has its frontmost lens unit, or first lens unit, made movable as a whole for focusing purposes. This is so called "front focus" type, being characterized in that, for the same object distance, the moved amount of the first lens unit is constant at any focal length. The use of such a type, therefore, leads to the advantage that the lens mounting mechanism is simple in the structure of construction.

However, if the refractive power of the first lens unit is positive and the zooming range includes very wide image angles, it is toward the object side that the first lens unit moves when focusing is effected down to shorter object distances. As the image angle widens, therefore, the effective diameter of the first lens unit increases rapidly to admit the off-axial light beam. Further, because the first lens unit is relatively heavy, the torque required to drive the first lens unit is increased greatly, thus making it difficult to perform quick focus adjustment.

So, in the invention applied to the zoom lens having the lens configuration and zooming principle described before, the rear lens subunit F12 is made to move toward the object side, as focusing to suit from an infinitely distant object to an object at the minimum distance. By employing such an inner focus type, the effective diameter of the first lens unit F is prevented from increasing in order to assure minimization of the bulk and size of the entire lens system and a shortening of the minimum object distance.

In addition, the present embodiment has, despite the use of the inner focus type, to correct aberrations well. For this purpose, the front lens subunit is constructed with at least one negative lens LN11 and at least one positive lens LP12 in separated contact, while the rear lens subunit is constructed with at least two positive lenses, wherein letting the focal length and F-number of the entire system in the telephoto end be denoted by fT and FNT, respectively, the focal length and F-number of the first lens unit by f1 and FN1, respectively, the focal lengths of the front and rear lens subunits by f11 and f12, respectively, and the difference between the Abbe numbers of materials of the negative lens LN11 and the positive lens LP12 by ΔvX, the following conditions are satisfied:

$$1.04 < FN1 < 1.55$$

where $$FN1 = f1/(fT/FNT) \quad (1)$$

$$0.28 < f1/fT < 0.80 \quad (2)$$

$$55 < \Delta vX \quad (3)$$

$$3 < |f11/f1| \quad (4)$$

$$0.77 < f12/f1 < 1.10 \quad (5)$$

Particularly in the present embodiment, the zoom lens has a zoom ratio of the order of 14 to 44. Along this, a great increase of the relative aperture is to be realized over the entire zooming range. A first step to be this end is that as the first lens unit F, use is made of as fast a lens system as to satisfy the condition (1). Then, the refractive power of the first lens unit F is determined so as to satisfy the condition (2), thus assuring improvement of the compact form.

Then, the variator V is made up so that its magnification varies past a point of −1× (unity magnification) during zooming. This zooming method affords it a high rate of variation of the magnification. Further, the compensator C of positive or negative power is made up with inclusion of at least one positive lens and at least one negative lens. Thus, improvements of the correction of aberrations such as spherical and chromatic ones are attained.

When the invention is applied to a zoom lens for use in, for example, a television camera for broadcasting, high specifications and high performance are demanded. Among others, a great increase of the focal length and relative aperture for the telephoto end is called for.

Within the framework of the so-called 4-unit zoom lens, the attempt to increase the focal length and relative aperture for the telephoto end leads, in the general case to, an extreme increase of the effective diameter of the front lens unit. This is because the height of incidence of the axial light beam increases greatly. In turn, zooming or focusing gives rise to production of large aberrations of wide variety beginning with spherical aberration and chromatic aberrations. So, it becomes difficult to correct these aberrations.

To take counter-measures, the number of lens elements may be increased to increase the degree of freedom of the design. If so, the entire lens system gets a larger size and a heavier weight, and the production cost rises.

In the present embodiment, therefore, the first lens unit F is made constructed with, from front to rear, a front lens subunit which is always stationary for any given object point, or so-called focus fixed lens subunit, F11, and a rear lens subunit which moves relatively on an optical axis to effect focusing, or so-called focus moving lens subunit, F12.

This front lens subunit F11 is then constructed with, from front to rear, at least one negative lens LN11 and, after a relatively small air spacing, at least one positive lens LP12.

In this front lens subunit F11, the negative and positive lenses LN11 and LP12 are made up from materials whose Abbe numbers differ from each other by an amount ΔvX, for which the condition (3) is set forth. When the condition (3) is satisfied, the variation with zooming or focusing of chromatic aberrations are corrected well.

In addition, the negative and positive lenses LN11 and LP12 are not cemented together, but are arranged in separated relation by a relatively small air spacing. As this air spacing is defined by the rear surface of the negative lens LN11 and the front surface of the positive lens P12, their curvatures are either almost equal to each other, or differentiated to form a so-called air lens of positive meniscus shape convex toward the object side.

The provision of this air lens extracts the following effects:

(a) Because the degree of freedom of design increases, the share of the aberration correction is lowered;

(b) Because every aberration can be made drastically adjustable, especially higher order aberrations become easy to control; and (c) Because the negative lens LN11 is left away, it pushes out the principal point of the front lens unit, thus contributing to a reduction of the size. Still another feature is that the focal length f11 of the front lens subunit F11 is determined by the condition (4) in terms of the overall focal length of the first lens unit F. This means that the front lens subunit F11, as viewed by the paraxial power arrangement, is given a considerably small refractive power in the absolute sense independently of the sign. However, what imposes the lower limit occurs in a case where the absolute value is derived of a negative refractive power. This means that, to reduce the size of the entire lens system in such a manner that the maximum image angle is increased, one of the common practices is to strengthen the power of the first lens unit, thus earning more of the lateral magnification of the zoom entire system.

With this, every lens element, too, of the first lens unit F has its refractive power to be strengthened. Due to the employment of the air lens described before, however, the front lens subunit F11 gets a strong divergence. Despite much increase of the so-called "retro" ratio, therefore, for the matter of aberrations, good stability is maintained in higher terms. However, if an extreme divergence were imparted, aberration correction by the other lens elements would become difficult to perform. Hence, a proper range is given with a limit by the condition (4).

It is also to be noted that the reason why no limitation is laid on the sign, positive or negative, of the focal length is that even if the focal length of the front lens subunit F11 is positive, it will occur that its contribution to the spherical aberration in the telephoto end takes a negative value. If so, the axial light beam, after having passed through the front lens subunit F11, acquires a diverging property.

Yet another feature is that the rear lens subunit F12 has at least two positive lenses. Although the zooming range is high and the MOD is short, a high optical performance must be obtained. So, a necessary minimum degree of freedom of the design is formed to correct the variation of spherical aberration, astigmatism, distortion and other aberrations. Another feature is the condition (5) for the focal length f12 of the rear lens subunit F12.

As the focal length f12 of the rear lens subunit F12 increases, its total focusing movement increases. This is reflected to increase the dead space in the front lens unit F, causing the bulk and size of the entirety of the first lens unit to increase, although it affects the size and weight of the complete zoom lens. Conversely, as the focal length f12 of the rear lens subunit F12 decreases, assistance is obtained in decreasing the size of the entirety of the front lens unit, but the radius of curvature of each lens surface in the rear lens subunit F12 rapidly decreases, making it difficult to correct the variation of aberrations with zooming or focusing.

A good balance between optical performance and the minimization of the bulk and size must then be taken into consideration by restricting the focal length f12 of the rear lens subunit F12. For the zoom lens that demands high optical performance like that for broadcasting, the bulk and size cannot be decreased so unduly as to sacrifice the optical performance. Hence, a proper range is set forth by the condition (5). An additional feature may be formed that a negative lens is used in the rear lens subunit F12 to afford for some aberrations to be canceled.

In the present embodiment, based on the rules described above, the first lens unit F is designed in respect to the optical arrangement and the conditions for the limitations. The satisfaction of the rules of optical arrangement and the conditions of limitation provides a possibility of obtaining the so-called "floating" effect.

The term "floating" used herein means that an arbitrary air spacing in the focusing lens unit expands or shrinks in response to focusing movement. During this time, the rays of light passing therethrough change their angles and heights in such a way as to suppress the variation of aberrations. For this reason, when doing floating, it is desirable to choose the one of the spacings which passes the light ray with an angle in divergence or convergence.

Since, in the present embodiment, the first lens unit F is formed with the lens of negative refractive power in the frontmost position and by using the air lens, because the principal point of the entirety of the first lens unit F is pushed toward the image side to insure that the bulk and size is minimized, use is made of the spacing after the front lens subunit F11, so that the axial rays emerging therefrom are divergent from the point of view of the contribution to the aberration correction.

In the invention, with regard to the telephoto end in which the aberrations vary with focusing, consideration must be given to the range of variation of spherical aberration and longitudinal chromatic aberration, which increases with increase of the height of incidence. To improve the correction of these aberrations, the values of contribution of the front and rear lens subunits F11 and F12 to the aberrations better satisfy the conditions described below.

Letting the total sum of the 3rd order coefficients of spherical aberration of all the lens surfaces in the front or rear lens subunit be denoted by S1 or S2, respectively the conditions, $$\left.\begin{array}{rcl} S1 & < & 0 \\ 0 & < & S2 \\ -0.90 & < & S1/S2 < -0.56 \end{array}\right\} \quad (6)$$

are satisfied at the full open F-number throughout the entire focusing range.

Further, letting the focal length and the Abbe number of the material of the i-th lens in the front lens subunit be denoted by f11i and v11i, respectively, and the focal length and the Abbe number of the material of the i-th lens in the rear lens subunit by f12i and v12i, respectively the conditions, $$-3.3 \times 10^{-4} < EF < 0$$

where $$EF = \Sigma 1/(f11i \times v11i) \quad (7)$$

$$0 < EM < 2.9 \times 10^{-4}$$

where $$EM = \Sigma 1/(f12i \times v12i) \quad (8)$$

$$-1.18 < EF/EM < -0.82 \quad (9)$$

are satisfied.

Concerning the spherical aberration coefficients of 3rd order, the condition (6) means that, from the reason described before, the front lens subunit F11 is made to produce diverging spherical aberration, while the rear lens subunit F12 is made to produce converging spherical aberration and also that the produced amounts of these are controlled so as not to effect over- or under-correction. Thus, good aberration correction is performed.

The other inequalities (7) and (8) constitute the so-called achromatic condition. The focal length and the Abbe number of every lens elements in the front and rear lens subunits F11 and F12 are so controlled as to satisfy the solution of the achromatic condition:

$$EF \approx EM \approx 0$$

The other condition (9) is to equalize the contributions of the front and rear lens subunits F11 and F12 to each other.

It will be appreciated from the foregoing that in the present embodiment, the front or first lens unit F is constructed from the front and rear lens subunits F11 and F12, and the proper design rules for the power arrangement, the materials of the lens elements and the aberration contributions are set forth so that all aberrations, particularly spherical aberration and longitudinal chromatic aberration are corrected well throughout the entire zooming range and throughout the entire focusing range.

Next, numerical examples 1 to 4 of the invention are shown. In the numerical data for the examples 1 to 4, Ri is the radius of curvature of the i-th lens surface, when counted from the object side, Di is the i-th axial lens thickness or air separation, and Ni and νi are respectively the refractive index and Abbe number of the glass of the i-th lens element. In the numerical examples 1 to 4, the last two or three surfaces define a glass block or blocks of a face plate, filters, etc.

The values of the factors in the conditions (1) to (9) for the numerical examples 1 to 4 are listed in Table-1.

The shape of an aspheric surface is expressed in the coordinates with an X axis in the axial direction and an H-axis in the direction perpendicular to an optical axis, the direction in which light advances being taken as positive by the following equation:

$$X = (1/R)H^2 \Big/ \left(1 + \sqrt{1 - (1+K)(H/R)^2}\right) + A_2 H^4 + A_3 H^6 + A_4 H^8 + A_5 H^{10}$$

where R is the radius of the osculating sphere, and K, $A_2$, $A_3$, $A_4$ and $A_5$ are the aspheric coefficients.

There are also shown the values of the spherical aberration coefficient of 3rd order of every lens surface in the telephoto end in each of the numerical examples.

Numerical Example 1:
f = 11.27  FNO = 1:1.6 – 1.8  2ω = 52.0° – 3.7°

| | | | |
|---|---|---|---|
| R1 = 3554.41 | D1 = 3.09 | N1 = 1.87400 | ν1 = 35.3 |
| R2 = 152.88 | D2 = 1.57 | | |
| R3 = 172.06 | D3 = 15.39 | N2 = 1.43875 | ν2 = 95.0 |
| R4 = –278.47 | D4 = 14.04 | | |
| R5 = 160.87 | D5 = 13.76 | N3 = 1.49700 | ν3 = 81.6 |
| R6 = –336.03 | D6 = 0.21 | | |
| R7 = 86.37 | D7 = 11.25 | N4 = 1.51633 | ν4 = 64.2 |
| R8 = 225.21 | D8 = variable | | |
| R9 = 70.95 | D9 = 1.65 | N5 = 1.77250 | ν5 = 49.6 |
| R10 = 29.20 | D10 = 6.76 | | |
| R11 = –2104.50 | D11 = 1.51 | N6 = 1.77250 | ν6 = 49.6 |
| R12 = 59.82 | D12 = 8.57 | | |
| R13 = –32.42 | D13 = 1.51 | N7 = 1.77250 | ν7 = 49.6 |
| R14 = 345.76 | D14 = 4.32 | N8 = 1.92286 | ν8 = 21.3 |
| R15 = –65.28 | D15 = Variable | | |
| R16 = –535.12 | D16 = 6.13 | N9 = 1.48749 | ν9 = 70.2 |
| R17 = –50.92 | D17 = 0.21 | | |
| R18 = 263.61 | D18 = 8.55 | N10 = 1.64000 | ν10 = 60.1 |
| R19 = –47.42 | D19 = 1.65 | N11 = 1.80518 | ν11 = 25.4 |
| R20 = –147.42 | D20 = 0.21 | | |
| R21 = 53.82 | D21 = 7.03 | N12 = 1.48749 | ν12 = 70.2 |
| R22 = –646.25 | D22 = Variable | | |
| R23 = (Stop) | D23 = 4.10 | | |
| R24 = –34.54 | D24 = 0.96 | N13 = 1.65160 | ν13 = 58.5 |
| R25 = 24.78 | D25 = 3.36 | N14 = 1.69895 | ν14 = 30.1 |
| R26 = 49.32 | D26 = 6.58 | | |
| R27 = –29.97 | D27 = 1.03 | N15 = 1.64000 | ν15 = 60.1 |
| R28 = –2416.74 | D28 = 6.00 | N16 = 1.68893 | ν16 = 31.1 |
| R29 = –27.45 | D29 = 23.38 | | |
| R30 = 101.35 | D30 = 8.48 | N17 = 1.48749 | ν17 = 70.2 |
| R31 = –28.60 | D31 = 1.51 | N18 = 1.75520 | ν18 = 27.5 |
| R32 = –38.07 | D32 = 0.14 | | |
| R33 = 175.76 | D33 = 1.31 | N19 = 1.75520 | ν19 = 27.5 |
| R34 = 27.12 | D34 = 6.72 | N20 = 1.51118 | ν20 = 51.0 |
| R35 = –276.56 | D35 = 0.76 | | |
| R36 = 43.76 | D36 = 3.99 | N21 = 1.48749 | ν21 = 70.2 |
| R37 = ∞ | D37 = 5.70 | | |
| R38 = ∞ | D38 = 47.57 | N22 = 1.51633 | ν22 = 64.2 |
| R39 = ∞ | | | |

| Variable | Focal Length | | |
|---|---|---|---|
| Separation | 11.28 | 43.77 | 169.22 |
| D8 | 8.49 | 55.79 | 78.03 |
| D15 | 110.05 | 48.77 | 2.07 |
| D22 | 2.05 | 16.03 | 40.49 |

The value of contribution of each surface to 3rd order aberration coefficient in telephoto end (Numerical Example 1)

| Surface No. | Longitudinal Chromatic Aberration | | Spherical Aberration | |
|---|---|---|---|---|
| | Infinity | Minimum | Infinity | Minimum |
| 1 | 0.012 | 0.049 | 0.000 | 0.052 |
| 2 | –0.519 | –0.666 | –58.015 | –103.794 |
| 3 | 0.114 | 0.147 | 38.260 | 68.955 |
| 4 | 0.025 | 0.023 | 0.064 | –0.073 |
| 5 | 0.105 | 0.136 | 10.150 | 20.028 |
| 6 | 0.087 | 0.095 | 8.782 | 8.915 |
| 7 | 0.145 | 0.190 | 3.775 | 9.977 |
| 8 | 0.051 | 0.049 | 2.430 | 1.926 |
| 9 | –0.023 | –0.023 | –0.510 | –0.510 |
| 10 | –0.108 | –0.108 | –5.327 | –5.327 |
| 11 | –0.020 | –0.020 | –0.155 | –0.155 |
| 12 | –0.084 | –0.084 | –6.331 | –6.331 |
| 13 | –0.092 | –0.092 | –2.098 | –2.098 |
| 14 | 0.258 | 0.258 | 3.172 | 3.172 |
| 15 | 0.018 | 0.018 | –0.027 | –0.027 |
| 16 | 0.030 | 0.030 | 2.198 | 2.198 |
| 17 | 0.045 | 0.045 | 1.530 | 1.530 |
| 18 | 0.031 | 0.031 | 0.615 | 0.615 |
| 19 | –0.261 | –0.261 | –3.219 | –3.219 |
| 20 | 0.087 | 0.087 | 0.320 | 0.320 |
| 21 | 0.054 | 0.054 | 3.945 | 3.945 |
| 22 | 0.033 | 0.033 | 2.404 | 2.404 |
| 23 | 0.000 | 0.000 | 0.000 | 0.000 |
| 24 | –0.054 | –0.054 | –9.394 | –9.394 |
| 25 | 0.081 | 0.081 | 0.515 | 0.515 |
| 26 | –0.071 | –0.071 | –2.136 | –2.136 |
| 27 | –0.027 | –0.027 | –0.226 | –0.226 |
| 28 | 0.042 | 0.042 | 0.155 | 0.155 |
| 29 | 0.109 | 0.109 | 3.278 | 3.278 |
| 30 | 0.014 | 0.014 | 0.273 | 0.273 |
| 31 | –0.167 | –0.167 | –4.786 | –4.786 |
| 32 | 0.169 | 0.169 | 11.532 | 11.532 |
| 33 | –0.031 | –0.031 | –0.189 | –0.189 |
| 34 | –0.117 | –0.117 | –2.049 | –2.049 |
| 35 | 0.022 | 0.022 | 0.552 | 0.552 |
| 36 | 0.012 | 0.012 | –0.047 | –0.047 |
| 37 | 0.021 | 0.021 | 2.092 | 2.092 |
| 38 | –0.021 | –0.021 | –1.872 | –1.872 |
| 39 | 0.003 | 0.003 | 0.300 | 0.300 |
| Total Sum | –0.021 | –0.018 | –0.037 | 0.502 |

-continued

Numerical Example 2:
f = 9.0  FNO = 1:1.7 – 2.0  2ω = 62.9° – 5.0°

| | | | |
|---|---|---|---|
| R1 = −409.82 | D1 = 2.50 | N1 = 1.76168 | ν1 = 27.5 |
| R2 = 131.70 | D2 = 3.86 | | |
| R3 = 226.86 | D3 = 7.89 | N2 = 1.43985 | ν2 = 95.0 |
| R4 = −210.28 | D4 = 0.20 | | |
| R5 = 185.11 | D5 = 6.65 | N3 = 1.43985 | ν3 = 95.0 |
| R6 = −432.14 | D6 = 7.25 | | |
| R7 = 97.28 | D7 = 9.98 | N4 = 1.49845 | ν4 = 81.6 |
| R8 = −296.46 | D8 = 0.20 | | |
| R9 = 58.15 | D9 = 5.98 | N5 = 1.73234 | ν5 = 54.7 |
| R10 = 116.22 | D10 = Variable | | |
| R11 = 82.50 | D11 = 0.80 | N6 = 1.88814 | ν6 = 40.8 |
| R12 = 16.69 | D12 = 4.85 | | |
| R13 = −60.39 | D13 = 0.80 | N7 = 1.82017 | ν7 = 46.6 |
| R14 = 44.25 | D14 = 2.55 | | |
| R15 = 29.50 | D15 = 4.52 | N8 = 1.82600 | ν8 = 23.7 |
| R16 = −51.57 | D16 = 0.94 | | |
| R17 = −30.82 | D17 = 0.80 | N9 = 1.77621 | ν9 = 49.6 |
| R18 = 123.22 | D18 = Variable | | |
| R19 = −28.08 | D19 = 0.90 | N10 = 1.76077 | ν10 = 47.8 |
| R20 = 44.63 | D20 = 2.37 | N11 = 1.85501 | ν11 = 23.9 |
| R21 = −788.03 | D21 = Variable | | |
| R22 = (Stop) | D22 = 1.10 | | |
| R23 = 219.42 | D23 = 3.26 | N12 = 1.70558 | ν12 = 41.2 |
| R24 = −59.63 | D24 = 0.20 | | |
| R25 = 126.00 | D25 = 2.15 | N13 = 1.50349 | ν13 = 56.4 |
| R26 = 1747.85 | D26 = 0.20 | | |
| R27 = 86.13 | D27 = 6.25 | N14 = 1.50349 | ν14 = 56.4 |
| R28 = −26.00 | D28 = 1.30 | N15 = 1.80811 | ν15 = 46.6 |
| R29 = −71.32 | D29 = 28.00 | | |
| R30 = 58.16 | D30 = 6.02 | N16 = 1.48915 | ν16 = 70.2 |
| R31 = −41.51 | D31 = 0.20 | | |
| R32 = −85.39 | D32 = 1.40 | N17 = 1.83932 | ν17 = 37.2 |
| R33 = 33.66 | D33 = 6.06 | N18 = 1.50014 | ν18 = 65.0 |
| R34 = −118.13 | D34 = 0.20 | | |
| R35 = 70.99 | D35 = 6.52 | N19 = 1.48915 | ν19 = 70.2 |
| R36 = −26.37 | D36 = 1.40 | N20 = 1.83945 | ν20 = 42.7 |
| R37 = −72.54 | D37 = 0.20 | | |
| R38 = 46.43 | D38 = 4.12 | N21 = 1.60548 | ν21 = 60.7 |
| R39 = −350.11 | D39 = 4.10 | | |
| R40 = ∞ | D40 = 30.00 | N22 = 1.60718 | ν22 = 38.0 |
| R41 = ∞ | D41 = 16.20 | N23 = 1.51825 | ν23 = 64.2 |
| R42 = ∞ | | | |

| Variable | Focal Length | | | | |
|---|---|---|---|---|---|
| Separation | 9.00 | 18.00 | 36.00 | 72.00 | 126.00 |
| D10 | 0.87 | 20.41 | 33.61 | 42.44 | 46.93 |
| D18 | 47.13 | 24.68 | 9.90 | 3.42 | 5.49 |
| D21 | 5.40 | 8.31 | 9.88 | 7.54 | 0.98 |

The value of contribution of each surface to 3rd order aberration coefficient in the telephoto end (Numerical example 2).

| Surface No. | Longitudinal Chromatic Aberration | | Spherical Aberration | |
|---|---|---|---|---|
| | Infinity | Minimum | Infinity | Minimum |
| 1 | −0.072 | −0.039 | −0.099 | 0.012 |
| 2 | −0.454 | −0.557 | −46.209 | −77.776 |
| 3 | 0.070 | 0.088 | 21.231 | 37.794 |
| 4 | 0.009 | 0.003 | −0.055 | −0.011 |
| 5 | 0.054 | 0.071 | 7.519 | 15.386 |
| 6 | 0.015 | 0.010 | 0.130 | 0.002 |
| 7 | 0.081 | 0.106 | 8.099 | 17.434 |
| 8 | 0.079 | 0.084 | 16.499 | 16.130 |
| 9 | 0.143 | 0.191 | −1.853 | 0.972 |
| 10 | 0.078 | 0.075 | 7.369 | 5.930 |
| 11 | −0.064 | −0.064 | −8.835 | −8.835 |
| 12 | −0.083 | −0.083 | −3.798 | −3.798 |
| 13 | −0.032 | −0.032 | −1.019 | −1.019 |
| 14 | −0.056 | −0.056 | −6.414 | −6.414 |
| 15 | 0.163 | 0.163 | 13.088 | 13.088 |
| 16 | 0.119 | 0.119 | 6.170 | 6.170 |
| 17 | −0.064 | −0.064 | −11.356 | 11.356 |
| 18 | −0.019 | −0.019 | −0.325 | −0.325 |
| 19 | −0.036 | −0.036 | −0.477 | −0.477 |
| 20 | 0.129 | 0.129 | 1.881 | 1.881 |
| 21 | −0.097 | −0.097 | −4.076 | −4.076 |
| 22 | 0.000 | 0.000 | 0.000 | 0.000 |
| 23 | 0.062 | 0.062 | 6.340 | 6.340 |
| 24 | 0.009 | 0.009 | −0.031 | −0.031 |
| 25 | 0.024 | 0.024 | 1.229 | 1.229 |
| 26 | −0.010 | −0.010 | −0.138 | −0.138 |
| 27 | 0.024 | 0.024 | 1.079 | 1.079 |
| 28 | −0.043 | −0.043 | −4.042 | −4.042 |
| 29 | 0.024 | 0.024 | 0.093 | 0.093 |
| 30 | 0.022 | 0.022 | 1.076 | 1.076 |
| 31 | 0.045 | 0.045 | 13.382 | 13.382 |
| 32 | −0.088 | −0.088 | −6.783 | −6.783 |
| 33 | −0.082 | −0.082 | −3.355 | −3.355 |
| 34 | 0.012 | 0.012 | 0.188 | 0.188 |
| 35 | 0.012 | 0.012 | 0.119 | 0.119 |
| 36 | −0.090 | −0.090 | −9.930 | −9.930 |
| 37 | 0.051 | 0.051 | 1.813 | 1.813 |
| 38 | 0.018 | 0.018 | 0.011 | 0.011 |
| 39 | 0.031 | 0.031 | 3.712 | 3.712 |
| 40 | −0.043 | −0.043 | −2.559 | −2.559 |
| 41 | 0.010 | 0.010 | 0.098 | 0.098 |
| 42 | 0.004 | 0.004 | 0.519 | 0.519 |
| Total Sum | −0.036 | −0.010 | 0.294 | 3.537 |

Numerical Example 3:
f = 8.50  FNO = 1:1.7 – 2.1  2ω = 65.8° – 4.9°

| | | | |
|---|---|---|---|
| R1 = −243.48 | D1 = 2.50 | N1 = 1.81265 | ν1 = 25.4 |
| R2 = 150.43 | D2 = 3.13 | | |
| R3 = 229.76 | D3 = 7.86 | N2 = 1.43985 | ν2 = 95.0 |
| R4 = −215.69 | D4 = 7.33 | | |
| R5 = 165.25 | D5 = 10.30 | N3 = 1.43985 | ν3 = 95.0 |
| R6 = −156.97 | D6 = 0.15 | | |
| R7 = 91.92 | D7 = 8.25 | N4 = 1.60520 | ν4 = 65.5 |
| R8 = −5448.23 | D8 = 0.15 | | |
| R9 = 53.54 | D9 = 5.38 | N5 = 1.77621 | ν5 = 49.6 |
| R10 = 88.04 | D10 = Variable | | |
| R11 = 51.26 | D11 = 0.90 | N6 = 1.88814 | ν6 = 40.8 |
| R12 = 16.17 | D12 = 4.80 | | |
| R13 = −63.80 | D13 = 0.80 | N7 = 1.82017 | ν7 = 46.6 |
| R14 = 27.55 | D14 = 4.03 | | |
| R15 = 27.93 | D15 = 4.20 | N8 = 1.82600 | ν8 = 23.7 |
| R16 = −54.11 | D16 = 0.75 | | |
| R17 = −30.52 | D17 = 0.80 | N9 = 1.77621 | ν9 = 49.6 |
| R18 = 124.76 | D18 = Variable | | |
| R19 = −26.78 | D19 = 0.90 | N10 = 1.77621 | ν10 = 49.6 |
| R20 = 45.15 | D20 = 2.47 | N11 = 1.85501 | ν11 = 23.9 |
| R21 = −318.46 | D21 = Variable | | |
| R22 = (Stop) | D22 = 1.10 | | |
| R23 = 177.68 | D23 = 3.91 | N12 = 1.51977 | ν12 = 52.4 |
| R24 = −42.08 | D24 = 0.20 | | |
| R25 = 112.64 | D25 = 2.72 | N13 = 1.51977 | ν13 = 52.4 |
| R26 = −179.30 | D26 = 0.20 | | |
| R27 = 69.16 | D27 = 6.04 | N14 = 1.51977 | ν14 = 52.4 |
| R28 = −31.66 | D28 = 1.30 | N15 = 1.82017 | ν15 = 46.6 |
| R29 = −206.87 | D29 = 32.00 | | |
| R30 = 65.05 | D30 = 5.69 | N16 = 1.48915 | ν16 = 70.2 |
| R31 = −41.40 | D31 = 0.20 | | |
| R32 = −82.84 | D32 = 1.40 | N17 = 1.83932 | ν17 = 37.2 |
| R33 = 30.46 | D33 = 5.78 | N18 = 1.50349 | ν18 = 56.4 |
| R34 = −300.07 | D34 = 0.20 | | |
| R35 = 63.06 | D35 = 6.80 | N19 = 1.48915 | ν19 = 70.2 |
| R36 = −25.89 | D36 = 1.40 | N20 = 1.83932 | ν20 = 37.2 |
| R37 = −57.77 | D37 = 0.20 | | |
| R38 = 36.55 | D38 = 4.53 | N21 = 1.51314 | ν21 = 60.5 |
| R39 = −607.99 | D39 = 4.00 | | |
| R40 = ∞ | D40 = 30.00 | N22 = 1.60718 | ν22 = 38.0 |
| R41 = ∞ | D41 = 16.20 | N23 = 1.51825 | ν23 = 64.2 |
| R42 = ∞ | | | |

-continued

| Variable | Focal Length | | | | |
|---|---|---|---|---|---|
| Separation | 8.50 | 17.00 | 34.00 | 68.00 | 127.50 |
| D10 | 1.11 | 19.56 | 31.96 | 40.17 | 44.67 |
| D18 | 44.42 | 23.18 | 9.32 | 3.39 | 6.16 |
| D21 | 6.20 | 8.99 | 10.45 | 8.17 | 0.90 |

The value of contribution of each surface to 3rd order aberration coefficient in telephoto end (Numerical Example 3)

| Surface No. | Longitudinal Chromatic Aberration | | Spherical Aberration | |
|---|---|---|---|---|
| | Infinity | Minimum | Infinity | Minimum |
| 1 | −0.149 | −0.124 | −0.532 | −0.053 |
| 2 | −0.563 | −0.732 | −57.708 | −108.482 |
| 3 | 0.083 | 0.110 | 30.951 | 60.323 |
| 4 | 0.002 | 0.006 | −0.005 | −0.063 |
| 5 | 0.075 | 0.098 | 16.590 | 33.061 |
| 6 | 0.057 | 0.058 | 5.724 | 4.101 |
| 7 | 0.130 | 0.172 | 7.740 | 19.117 |
| 8 | 0.106 | 0.109 | 15.147 | 13.563 |
| 9 | 0.200 | 0.269 | −4.761 | −1.964 |
| 10 | 0.073 | 0.059 | 4.578 | 2.652 |
| 11 | −0.066 | −0.066 | −8.751 | −8.751 |
| 12 | −0.082 | −0.082 | −1.137 | −1.137 |
| 13 | −0.044 | −0.044 | −3.084 | −3.084 |
| 14 | −0.076 | −0.076 | −13.151 | −13.151 |
| 15 | 0.186 | 0.186 | 16.297 | 16.297 |
| 16 | 0.132 | 0.132 | 7.221 | 7.221 |
| 17 | −0.073 | −0.073 | −14.200 | −14.200 |
| 18 | −0.020 | −0.020 | −0.318 | −0.318 |
| 19 | −0.042 | −0.042 | −0.823 | −0.823 |
| 20 | 0.149 | 0.149 | 1.897 | 1.897 |
| 21 | −0.100 | −0.100 | −4.002 | −4.002 |
| 22 | 0.000 | 0.000 | 0.000 | 0.000 |
| 23 | 0.045 | 0.045 | 6.846 | 6.846 |
| 24 | 0.018 | 0.018 | −0.073 | −0.073 |
| 25 | 0.030 | 0.030 | 1.540 | 1.540 |
| 26 | 0.003 | 0.003 | −0.001 | −0.001 |
| 27 | 0.028 | 0.028 | 0.833 | 0.833 |
| 28 | −0.038 | −0.038 | −4.097 | −4.097 |
| 29 | 0.007 | 0.007 | 0.000 | 0.000 |
| 30 | 0.019 | 0.019 | 0.664 | 0.664 |
| 31 | 0.047 | 0.047 | 13.659 | 13.659 |
| 32 | −0.093 | −0.093 | −7.109 | −7.109 |
| 33 | −0.084 | −0.084 | −4.957 | −4.957 |
| 34 | 0.002 | 0.002 | −0.000 | −0.000 |
| 35 | 0.019 | 0.019 | 0.639 | 0.639 |
| 36 | −0.121 | −0.121 | −9.366 | −9.366 |
| 37 | 0.074 | 0.074 | 2.791 | 2.791 |
| 38 | 0.025 | 0.025 | 0.324 | 0.324 |
| 39 | 0.029 | 0.029 | 3.230 | 3.230 |
| 40 | −0.045 | −0.045 | −2.709 | −2.709 |
| 41 | 0.011 | 0.011 | 0.103 | 0.103 |
| 42 | 0.005 | 0.005 | 0.549 | 0.549 |
| Total Sum | −0.036 | −0.039 | 0.541 | 5.072 |

Numerical Example 4:
f = 14.0  FNO = 1:2.45 − 4.2  2ω = 42.9° − 1.0°

| | | | |
|---|---|---|---|
| R1 = 412.92 | D1 = 5.50 | N1 = 1.85649 | ν1 = 32.3 |
| R2 = 185.82 | D2 = 0.25 | | |
| R3 = 185.28 | D3 = 19.08 | N2 = 1.43985 | ν2 = 95.0 |
| R4 = −3890.59 | D4 = 9.93 | | |
| R5 = 210.59 | D5 = 14.55 | N3 = 1.43985 | ν3 = 95.0 |
| R6 = 4882.30 | D6 = 0.20 | | |
| R7 = 189.41 | D7 = 12.65 | N4 = 1.45720 | ν4 = 90.3 |
| R8 = 849.12 | D8 = 0.20 | | |
| R9 = 184.77 | D9 = 9.56 | N5 = 1.49845 | ν5 = 81.6 |
| R10 = 450.59 | D10 = Variable | | |
| R11 = 1978.17 | D11 = 2.00 | N6 = 1.82017 | ν6 = 46.6 |
| R12 = 61.00 | D12 = 4.30 | | |
| R13 = −244.81 | D13 = 1.80 | N7 = 1.77621 | ν7 = 49.6 |
| R14 = 49.97 | D14 = 7.53 | | |
| R15 = −56.56 | D15 = 1.80 | N8 = 1.82017 | ν8 = 46.6 |
| R16 = 48.78 | D16 = 7.71 | N9 = 1.93306 | ν9 = 21.3 |
| R17 = −227.11 | D17 = Variable | | |
| R18 = 1717.21 | D18 = 6.39 | N10 = 1.49845 | ν10 = 81.6 |
| R19 = −106.26 | D19 = 0.30 | | |
| R20 = 200.29 | D20 = 2.50 | N11 = 1.65223 | ν11 = 33.8 |
| R21 = 72.78 | D21 = 12.98 | N12 = 1.59143 | ν12 = 61.2 |
| R22 = −125.34 | D22 = 0.20 | | |
| R23 = 107.54 | D23 = 13.87 | N13 = 1.62032 | ν13 = 63.4 |
| R24 = −71.24 | D24 = 2.50 | N14 = 1.85501 | ν14 = 23.9 |
| R25 = −196.04 | D25 = 0.20 | | |
| R26 = 124.29 | D26 = 3.50 | N15 = 1.48915 | ν15 = 70.2 |
| R27 = 221.46 | D27 = Variable | | |
| R28 = (Stop) | D28 = 2.89 | | |
| R29 = −54.75 | D29 = 1.80 | N16 = 1.79013 | ν16 = 44.2 |
| R30 = 37.11 | D30 = 4.93 | N17 = 1.81265 | ν17 = 25.4 |
| R31 = 202.88 | D31 = 6.91 | | |
| R32 = −53.04 | D32 = 1.60 | N18 = 1.73234 | ν17 = 54.7 |
| R33 = 34.16 | D33 = 7.84 | N19 = 1.59911 | ν18 = 39.2 |
| R34 = −35.88 | D34 = 20.00 | | |
| R35 = 365.53 | D35 = 4.61 | N20 = 1.48915 | ν19 = 70.2 |
| R36 = −35.90 | D36 = 0.20 | | |
| R37 = −61.03 | D37 = 2.20 | N21 = 1.79013 | ν21 = 44.2 |
| R38 = 34.15 | D38 = 5.94 | N22 = 1.50349 | ν22 = 56.4 |
| R39 = −46.65 | D39 = 1.10 | | |
| R40 = 556.89 | D40 = 4.36 | N23 = 1.55099 | ν22 = 45.8 |
| R41 = −46.17 | D41 = 2.20 | N24 = 1.81265 | ν23 = 25.4 |
| R42 = −177.20 | D42 = 0.20 | | |
| R43 = −2240.85 | D43 = 2.70 | N25 = 1.51977 | ν25 = 52.4 |
| R44 = −64.85 | D44 = 5.00 | | |
| R45 = ∞ | D45 = 50.00 | N26 =0 1.51825 | ν26 = 64.2 |
| R46 = ∞ | | | |

| Variable | Focal Length | | | | |
|---|---|---|---|---|---|
| Separation | 14.00 | 27.29 | 97.69 | 359.24 | 616.00 |
| D10 | 5.46 | 47.46 | 95.46 | 118.96 | 124.46 |
| D17 | 178.14 | 131.08 | 68.95 | 21.77 | 2.18 |
| D27 | 3.30 | 8.36 | 22.49 | 46.17 | 60.26 |

The Shape of an Aspheric Surface

| Reference Sphere | R = 124.297 |
|---|---|
| Aspheric Coefficients | A = B = C = E = 0 |
| | D = 5.99704 × 10$^{-14}$ |

The value of contribution of each surface to 3rd order aberration coefficient in telephoto end (Numerical Example 4)

| Surface No. | Longitudinal Chromatic Aberration | | Spherical Aberration | |
|---|---|---|---|---|
| | Infinity | Minimum | Infinity | Minimum |
| 1 | 0.990 | 1.200 | 36.300 | 69.827 |
| 2 | −3.192 | −3.612 | −1960.567 | −2661.373 |
| 3 | 0.674 | 0.763 | 1544.973 | 2088.964 |
| 4 | 0.019 | −0.003 | 0.018 | −0.001 |
| 5 | 0.409 | 0.475 | 237.855 | 364.404 |
| 6 | 0.148 | 0.139 | 30.266 | 22.897 |
| 7 | 0.289 | 0.347 | 7.323 | 31.451 |
| 8 | 0.235 | 0.235 | 125.596 | 115.001 |
| 9 | 0.129 | 0.176 | −15.177 | −23.649 |
| 10 | 0.329 | 0.336 | 262.290 | 256.185 |
| 11 | −0.321 | −0.321 | −241.207 | −241.207 |
| 12 | −0.076 | −0.076 | 2.940 | 2.940 |
| 13 | −0.170 | −0.170 | −44.639 | −44.639 |
| 14 | −0.300 | −0.300 | −160.407 | −160.407 |
| 15 | −0.143 | −0.143 | 1.602 | 1.602 |
| 16 | 1.260 | 1.260 | 131.823 | 131.823 |
| 17 | −0.368 | −0.368 | −26.757 | −26.757 |
| 18 | 0.096 | 0.096 | 58.123 | 58.123 |

-continued

| | | | | |
|---|---|---|---|---|
| 19 | 0.016 | 0.016 | −0.451 | −0.451 |
| 20 | 0.296 | 0.296 | 47.621 | 47.621 |
| 21 | −0.331 | −0.331 | −17.547 | −17.547 |
| 22 | 0.103 | 0.103 | 7.740 | 7.740 |
| 23 | 0.119 | 0.119 | 12.091 | 12.091 |
| 24 | −0.831 | −0.831 | −65.869 | −65.869 |
| 25 | 0.493 | 0.493 | 49.542 | 49.542 |
| 26 | 0.007 | 0.007 | −0.083 | −0.083 |
| 27 | 0.039 | 0.039 | 4.135 | 4.135 |
| 28 | 0.000 | 0.000 | 0.000 | 0.000 |
| 29 | −0.130 | −0.130 | −45.232 | −45.232 |
| 30 | 0.111 | 0.111 | 0.286 | 0.286 |
| 31 | −0.002 | −0.002 | 0.000 | 0.000 |
| 32 | −0.050 | −0.050 | −4.651 | −4.651 |
| 33 | 0.037 | 0.037 | −8.489 | −8.489 |
| 34 | 0.103 | 0.103 | 14.155 | 14.155 |
| 35 | −0.002 | −0.002 | −0.009 | −0.009 |
| 36 | 0.056 | 0.056 | 36.830 | 36.830 |
| 37 | −0.095 | −0.095 | −21.901 | −21.901 |
| 38 | −0.048 | −0.048 | −5.136 | −5.136 |
| 39 | 0.047 | 0.047 | 8.852 | 8.852 |
| 40 | −0.015 | −0.015 | −0.279 | −0.279 |
| 41 | −0.115 | −0.115 | −4.543 | −4.543 |
| 42 | 0.068 | 0.068 | 1.513 | 1.513 |
| 43 | −0.015 | −0.015 | −0.461 | −0.461 |
| 44 | 0.049 | 0.049 | 10.579 | 10.579 |
| 45 | −0.019 | −0.019 | −2.062 | −2.062 |
| 46 | 0.006 | 0.006 | 0.731 | 0.731 |
| Total Sum | −0.093 | −0.068 | 7.720 | 2.547 |

| | Numerical Example | | | |
|---|---|---|---|---|
| Condition | 1 | 2 | 3 | 4 |
| (1) fN1 | 1.416 | 1.110 | 1.054 | 1.275 |
| (2) f1/fT | 0.785 | 0.556 | 0.502 | 0.304 |
| (3) Δ ν X | 59.7 | 67.5 | 70.0 | 62.7 |
| (4) \|f11/f1\| | 5.97 | 77.97 | 3.391 | 1604.6 |
| (5) f12/f1 | 0.91 | 1.08 | 0.875 | 0.991 |
| (6) S1/S2 | −0.783 | −0.581 | −0.606 | −0.585 |
| (7) EF | −1.12 × 10⁻⁴ | −2.01 × 10⁻⁴ | −3.03 × 10⁻⁴ | −5.15 × 10⁻⁵ |
| (8) EM | 1.15 × 10⁻⁴ | 2.03 × 10⁻⁴ | 2.82 × 10⁻⁴ | 6.17 × 10⁻⁵ |
| (9) EF/EM | −0.979 | −0.989 | −1.077 | −0.834 |

Next, the features of each of the numerical examples 1 to 4 of the invention is described below.

The numerical example 1 shown in FIG. 1 has a zoom ratio of more than 15. R1 to R8 form a first lens unit (focusing lens unit F). Of these, R1 to R4 constitute a front lens subunit F11 which is stationary during zooming and focusing, and give it a negative refractive power as a whole. R5 to R8 constitute a rear lens subunit F12 of positive refractive power. By R1 to R8, an object point for the variator V is focused. The front lens unit F having such a function is positive in refractive power as a whole.

R9 to R15 contribute mainly to variation of the focal length as a variator V. When zooming from the wide-angle end to the telephoto end, the variator V moves toward the image side monotonously, while its magnification varies past −1× (unity magnification) on the way. R16 to R22 are a compensator C which functions mainly to compensate for the image shift with zooming and has even a function of varying the focal length. The compensator C has a positive refractive power and, when zooming from the wide-angle end to the telephoto end, moves from a reference position for the wide-angle end toward the object side monotonously. SP (R23) stands for a stop.

R24 to R37 are a relay lens unit R having the image forming function. R38 and R39 are a glass block equivalent to a color separation prism.

As an indicator of increase of the aperture ratio, the F-number of the front lens unit is used by defining FN1=f1 (fT/FNT). Then, in this example, FN1=1.416. Also, as an indicator of decrease of the size, the power contribution of the front lens unit is used by f1/fT. Then, it is 0.785 in this example.

For such a large aperture and a power contribution, it is in the front lens unit that, to correct spherical aberration and longitudinal chromatic aberration, the front lens subunit is given one negative lens and one positive lens therein and the rear lens subunit is given two positive lenses therein. Thus, the correction is made in sharing fashion.

In general, for the front lens unit F, as its configuration is made as simple as possible, a shorter thickness of the block is rather preferred in the point of view of minimizing the entire lens system and saving electric power. For this reason, it is desired that the front lens unit F has as small a number of constituent lenses as possible.

In contradiction to this, as mentioned before, the F-number of the front lens unit F gets very fast and, furthermore, its power contribution gets strong. The difficulty of correcting spherical aberration, longitudinal chromatic aberration and others against zooming or focusing is, therefore, caused to increase.

So, in this example, as the first lens of the front lens subunit, use is made of a negative lens whose material has a very high refractive index. At the same time, as the second lens of the front lens subunit, use is made of a positive lens whose material has a very large Abbe number, thus suppressing the production of spherical aberration and longitudinal chromatic aberration. In this case, the Abbe numbers of the materials in the front lens subunit differ by $\nu\Delta X=59.7$.

Further, the front lens subunit and the rear lens subunit contribute to the spherical aberration in the telephoto end (over the entire focusing range) by the following values:

$$-0.853 \leq S1/S2 \leq -0.783$$

Achromatic Contribution: EF/EM=−0.979

The numerical example 2 shown in FIG. 2 has a zoom ratio exceeding 14. R1 to R10 are a first lens unit F. Of these, R1 to R6 are a front lens subunit F11 which is stationary during zooming or focusing and has a positive refractive power. R7 to R10 are a rear lens subunit F12 having a positive refractive power. By R1 to R10, an object point for the variator V is focused. The first lens unit F has a positive refractive power as a whole.

R11 to R18 are a variator V which has a main contribution to variation of the focal length and, when zooming from the wide-angle end to the telephoto end, moves toward the image side monotonously, while its magnification varies past −1× (unity magnification) on the way. R19 to R21 are a compensator C of negative refractive power which functions mainly to compensate for the image shift with zooming. When zooming from the wide-angle end to the telephoto end, the compensator C moves from a reference position for the wide-angle end first toward the object side, and then toward the image side at a certain focal length, reaching a more rear position at the telephoto end than the reference position for the wide-angle end. SP (R22) stands for a stop.

R23 to R39 are a relay lens unit R having the image forming function. R40 to R42 are a glass block equivalent to a color separation prism.

As compared with the numerical example 1, although the zoom ratio is lowered to 14, an image-angle for the wide-angle end of 2ω=62.9° is achieved.

To permit this increase of the maximum image angle, there is need to well correct all the aberrations which depend mostly on the image angle, such as distortion and lateral chromatic aberration. Also, the first lens unit F is of a very fast F-number at FN1=1.110.

So, in this numerical example, the front lens subunit is constructed with one negative lens and two positive lenses. Moreover, the difference Δνx of the Abbe numbers of the materials for the negative lens and the two positive lenses is made very large to 67.5. By this, chromatic aberrations are well corrected, although the image angle is very wide. Also, even in the rear lens subunit, of the two positive lenses, the rear one is made from a material of very high refractive index. Such an optical arrangement, whilst doing good correction of spherical aberration and distortion, contributes to a correction of chromatic aberrations.

The numerical example 3 shown in FIG. 3, though being almost similar in lens configuration to the numerical example 2, has achieved an increase of the maximum image angle and an increase of the range of magnifications by choosing a proper power arrangement. The zoom ratio is 15.

To simultaneously improve the compact form, each lens unit is made to share a stronger power, so that the total zooming movements of the variator V and compensator C are reduced.

For this reason, a severe condition is put on the first lens unit F. So, its F-number and power contribution are FN1= 1.054 and f1/fT=0.502. In addition, for the maximum image angle to increase, it is unavoidable to raise the retro ratio of the front lens subunit. For this reason, the front and rear lens subunits take the power shares of $|f11/f1|=3.391$ and f12/ f1=0.875, respectively.

So, in this example, the front lens subunit is constructed with one negative lens and one positive lens, and the rear lens subunit is constructed with three positive lenses. In the front lens subunit, the negative lens has a relatively high refractive index and a very small Abbe number, and the positive lens has a very large Abbe number. The difference $\Delta vX$ reaches as high as 70. For this reason, not only spherical aberration and longitudinal chromatic aberration as a matter of course, but also distortion and lateral chromatic aberration due to the increase of the maximum image angle are well corrected.

Also, the use of three positive lenses in the rear lens subunit results in good suppression of the variation of the aberrations particularly with focusing. This owes to an increase of the degree of freedom of the design of the focusing lens subunit and produces the following results:

Because it is made possible to give room for correcting the variation of not only spherical aberration but also astigmatism and other aberrations, the optical performance, particularly the resolving power, is improved. Because the variety of materials to choose for the lens elements widens, particularly the positive lens is made from a material of very large Abbe number to improve the achromatism of the rear lens subunit. Thus, the variation of chromatic aberrations is reduced to diminish the color diffusion in the picture.

The numerical example 4 shown in FIG. 4, though having an image angle for the wide-angle end of $2\omega=42.9°$, gives as high a zoom ratio as 44. The image angle for the telephoto end is as much down as $2\omega=1.0°$. Thus, the zoom lens is of very high range as such.

This example, because of the very long focal length for the telephoto end, lies under a very severe condition that the power contribution of the first lens unit is f1/fT=0.304. In addition to this, as the focal length for the telephoto end increases, the difficulty of correcting spherical aberration and longitudinal chromatic aberration increases.

So, in this example, though not being a wide-angle zoom lens like that of the numerical example 3, the rear lens subunit is first comprised of three positive lenses to derive similar results to those of the numerical example 3. Then, an aspheric sphere is applied to the surface R26 in the compensator C so as to correct, particularly, spherical aberration on the telephoto side. Then, the front lens subunit has its positive lens element made from a material of very large Abbe number, and even the rear lens subunit is included with such positive lens elements. Thus, the achromatism is improved. By these techniques, aberration correction is performed so as to obtain high optical performance even in the telephoto end of ultra-long focal length.

In this case, the contributions of the front and rear lens subunits to spherical aberration is $$-0.656 \leq S1/S2 \leq -0.585$$

The achromatic contributions each have a small value as follows:

$$EF=-5.148\times10^{-5}$$

$$EM=6.169\times10^{-5}$$

whereby $$EF/EM=-0.834$$

Next, an explanation is given to further improved zoom lenses. Here, an embodiment is disclosed wherein the first lens unit is divided into three lens subunits to well correct the variation of aberration with focusing.

Figure 9:
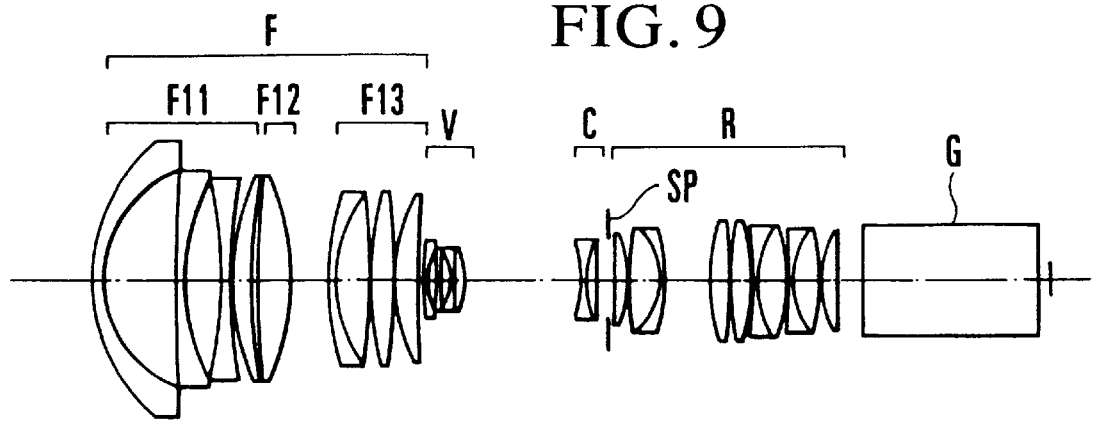
FIG. 9 is a lens block diagram of a numerical example 5 of the invention.
Figure 10:
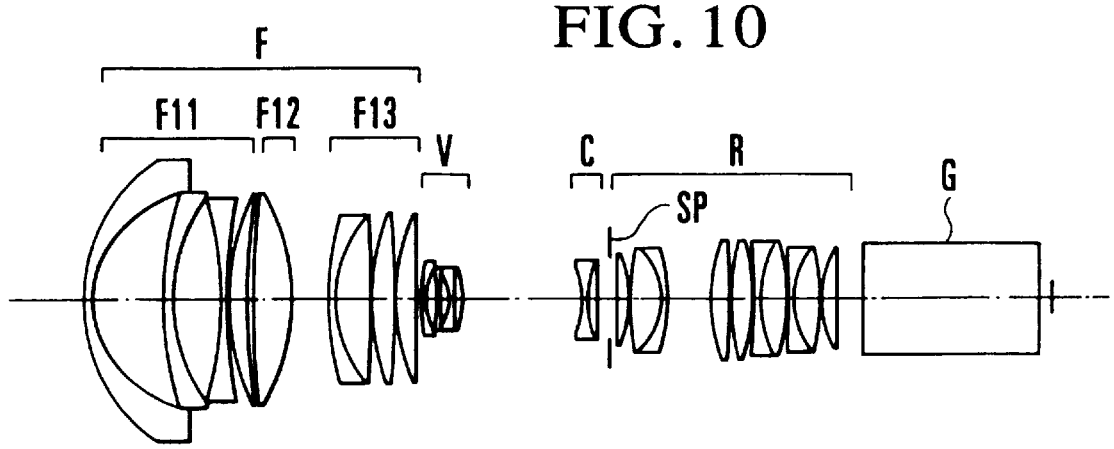
FIG. 10 is a lens block diagram of a numerical example 6 of the invention.
Figure 11:
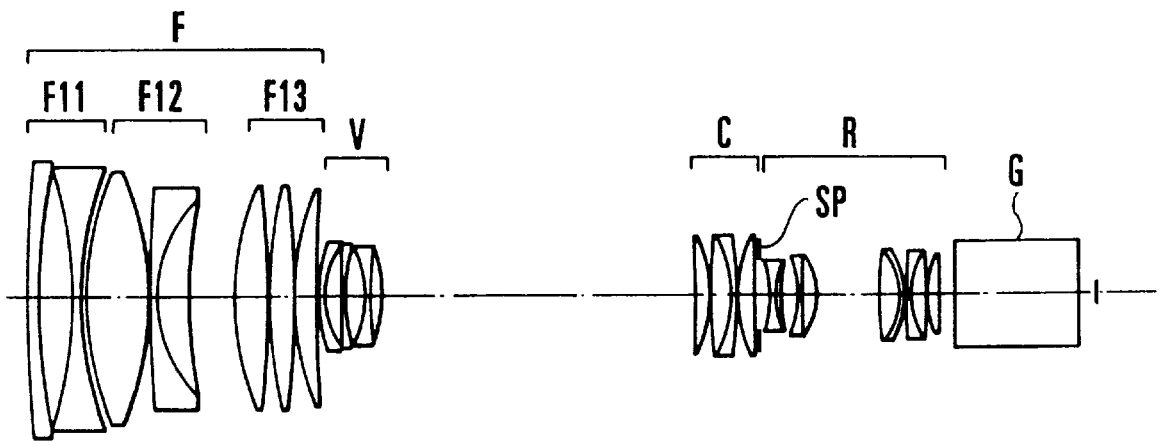
FIG. 11 is a lens block diagram of a numerical example 7 of the invention.
Figure 15:
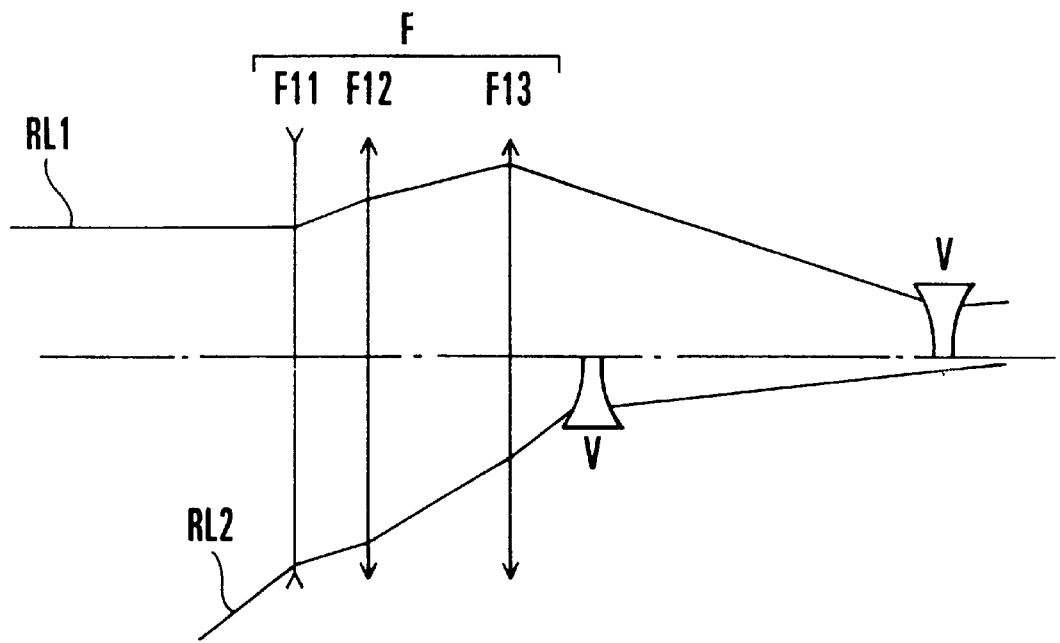
FIG. 15 is a diagram used to explain the conventional inner focus type zoom lens.
Figure 16:
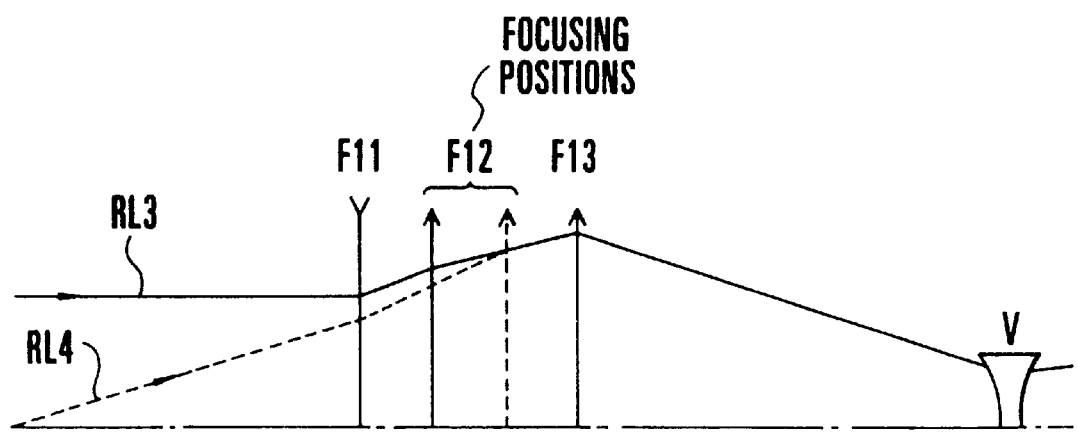
FIG. 16 is a diagram used to explain the conventional inner focus type zoom lens.

FIG. 9, FIG. 10 and FIG. 11 in block diagram show numerical examples 5, 6 and 7 of the invention in the wide-angle end, respectively.

In the drawings, a front or first lens unit (focusing lens unit) F comprises a fixed front lens subunit of negative refractive power including at least two lenses, a middle lens subunit F12 of positive refractive power for focusing, and a fixed rear lens subunit F13 of positive refractive power.

Focusing from an infinitely distant object to an object at the minimum distance is performed by moving the middle lens subunit F12 toward the image side. A second lens unit for varying the focal length, or variator V of negative refractive power, moves axially toward the image side monotonously when zooming from the wide-angle end to the telephoto end. The magnification of the second lens unit V is made to vary in a range including unity (−1×).

A third lens unit or compensator C of positive or negative refractive power moves axially, while depicting a locus convex toward the object side, to compensate for the image shift with zooming. SP stands for a stop. R denotes a relay lens unit as a fourth lens unit of positive refractive power. G denotes a color separation prism and optical filters shown in FIGS. 9 to 11, as a glass block.

In general, the 4-unit zoom lens has its frontmost lens unit or first lens unit made movable as a whole to effect focusing. With the use of this so-called front focus type, at any zooming station, the focusing movement of the first lens unit remains constant for the same object distance. Therefore, it has an advantage that the structure of construction of the lens mounting mechanism becomes simple.

However, if the first lens unit has a positive refractive power and the zoom lens is of wide image angle, the first lens unit moves toward the object side when focusing is effected down to shorter object distances. In the wide-angle end, therefore, the effective diameter of the first lens unit increases to admit the off-axial light beam. Also, because the first lens unit of relatively heavy weight is moved, the drive torque increases largely so that quick focus adjustment becomes difficult.

So, in application of the invention to the zoom lens having the construction and condition described above, when focusing from an infinitely distant object to an object at the minimum distance, the middle lens subunit F12 is made to move toward the image side. By employing such an inner focus type, the effective diameter of the first lens unit is prevented from increasing. With the help of this, the bulk and size of the entire lens system is minimized. Further, the minimum object distance is shortened.

Particularly for the zoom ratio, the shortest focal length fw of the entire system and the effective image frame size (diameter) IS, the following conditions are set forth:

$$8 \leq Z \quad (10)$$

$$0.53 \leq fw/IS \leq 0.79 \quad (11)$$

When these conditions (10) and (11) are satisfied, the maximum image angle is increased while still permitting good stability of optical performance of the entire area of the image frame to be maintained over the entire zooming range.

Also, the refractive powers of the first lens unit and the middle lens subunit, and the paraxial power arrangement must be properly determined. For this purpose, the following condition is satisfied:

$$\beta T_{MOD} \leq -0.2 \quad (12)$$

where $\beta T_{MOD}$ is the image magnification for an object at the minimum distance in the telephoto end.

To further improve the variation of aberrations with focusing to obtain high optical performance over the entire focusing range in such a manner that the bulk and size of the entire lens system is minimized, it is recommended that the front lens subunit includes a negative lens and the middle lens subunit includes a positive lens, wherein the following conditions are satisfied:

$$0.8 \leq |f11|/f1 \leq 1.4 \quad (13)$$

$$2.1 \leq f12/f1 \leq 3.9 \quad (14)$$

$$1.6 \leq N11_N \quad (15)$$

$$N12_p \leq 1.59 \quad (16)$$

where f1 is the focal length of the first lens unit, f11 and f12 are the focal lengths of the front and middle lens subunits, respectively, $N11_N$ is the refractive index of the material of the negative lens of the front lens subunit F11, and $N12_p$ is the refractive index of the material of the positive lens of the middle lens subunit F12.

When the refractive power of the front or middle lens subunit is stronger than the lower limit of the condition (13) or (14), the size of the entire lens system is minimized, but distortion in the wide-angle end and curvature of field in the telephoto end increase objectionably.

Conversely when the refractive power of the front or middle lens subunit is weaker than the upper limit of the condition (13) or (14), it is advantageous for correcting aberrations, but a large space for the focusing movement of the middle lens subunit becomes necessary, causing the size of the entire lens system to increase objectionably.

When the condition (15) is violated, or the refractive index of the material of the negative lens in the front lens subunit is smaller than the limit, as this means that the curvatures of the negative lens are large, negative distortion increases in the wide-angle end. Also, the negative Petzval sum increases, which is reflected to further increase the large negative Petzval sum that the second lens unit (variator), V produces.

When the condition (16) is violated, or the refractive index of the material of the positive lens in the middle lens subunit is larger than the limit, as this means that the curvatures of this positive lens are small, insufficient correction of negative distortion results in the wide-angle end. Also, the positive Petzval sum decreases, so that it becomes difficult to correct the negative Petzval sum that the second lens unit produces.

To further improve the correction of the variation of aberrations with focusing in such a manner that the maximum image angle is increased and the minimum object distance is shortened, the invention makes use of at least one aspheric surface in the front or middle lens subunit.

In the numerical examples 5, 6 and 7 to be described later, the aspheric sphere is applied to the negative refracting surface in the front lens subunit F11. In any case, the shape is such that the negative refractive power gets progressively weaker from the central zone of the lens to a height at which the $F_{NO}$ light beam passes.

This decreases the over-corrected spherical aberration due to the $F_{NO}$ light beam for the telephoto end which passes at a high height from the optical axis when focusing on an infinitely distance object. Thus, its difference from the under-corrected spherical aberration with an object at the minimum distance is reduced. Thus, the variation of spherical aberration is minimized over the entire focusing range.

Then, from the height of the $F_{NO}$ light beam for the telephoto end to the maximum of the effective diameter, the negative refractive power gets either weaker or stronger. That is, the aspheric surface is formed to either one of the two shapes.

In the numerical examples 5 and 7 to be described later, the aspheric surface of weakening negative refractive powers is used mainly to well correct negative distortion in the wide-angle end. Also, in the numerical example 6, the aspheric surface of strengthening negative refractive powers is used mainly to well correct field curvature in the wide-angle end.

It is to be noted that, in the present embodiment, the aspheric sphere may otherwise be applied to a positive refracting surface in the front lens subunit, the shape being such that the positive refractive power gets progressively stronger from the central to the marginal zone. Even in this case, a similar result is attained.

Besides these, in application of the aspheric sphere to a lens surface in the middle lens subunit, it is recommended to make the shape such that from the central zone to the height at which the $F_{NO}$ light beam for the telephoto end passes, if the surface is positive in refracting, the positive refractive power gets weaker as the distance from the optical axis increases, or if the surface is negative in refracting, the negative refractive power gets stronger as the distance from the optical axis increases.

This can reduce the under-corrected spherical aberration due to the increase of the height from the optical axis with an object at the minimum distance.

It is to be noted that, in the present embodiment, both of the front and middle lens subunits may otherwise be made to include aspheric surfaces. If so, the variation of spherical aberration with focusing is further well corrected by the synergistic effect.

Next, numerical examples 5 to 7 of the invention are shown. The values of the factors in the above-described conditions (10) to (16) for the numerical examples 5 to 7 are listed in Table-2.

Numerical Example 5:
f = 5.82 – 46.58   FNO = 1:1.64   Image Diagonal Length: 11.0

| | | | |
|---|---|---|---|
| R1 = 59.63 | D1 = 2.50 | N1 = 1.77621 | ν1 = 49.6 |
| R2 = 36.96 | D2 = 23.54 | | |
| R3 = 768.34 | D3 = 2.00 | N2 = 1.73234 | ν2 = 54.7 |
| R4 = 62.18 | D4 = 13.50 | | |
| R5 = –126.36 | D5 = 2.00 | N3 = 1.60548 | ν3 = 60.7 |
| *R6 = 196.25 | D6 = 0.20 | | |
| R7 = 77.24 | D7 = 6.20 | N4 = 1.81265 | ν4 = 25.4 |
| R8 = 200.88 | D8 = 1.90(∞) | | |
| R9 = 303.62 | D9 = 10.70 | N5 = 1.48915 | ν5 = 70.2 |
| R10 = –81.60 | D10 = 11.70(∞) | | |
| R11 = 97.90 | D11 = 2.00 | N6 = 1.85501 | ν6 = 23.9 |
| R12 = 44.99 | D12 = 11.00 | N7 = 1.48915 | ν7 = 70.2 |
| R13 = –246.24 | D13 = 0.20 | | |
| R14 = 93.88 | D14 = 8.00 | N8 = 1.50014 | ν8 = 65.0 |
| R15 = –221.48 | D15 = 0.20 | | |
| R16 = 59.35 | D16 = 7.00 | N9 = 1.73234 | ν9 = 54.7 |
| R17 = 398.09 | D17 = Variable | | |
| R18 = 61.10 | D18 = 1.00 | N10 = 1.88814 | ν10 = 40.8 |
| R19 = 18.76 | D19 = 3.80 | | |
| R20 = –63.98 | D20 = 0.80 | N11 = 1.80811 | ν11 = 46.6 |
| R21 = 82.33 | D21 = 3.76 | | |
| R22 = –16.14 | D22 = 0.80 | N12 = 1.77621 | ν12 = 49.6 |
| R23 = 307.48 | D23 = 3.20 | N13 = 1.93306 | ν13 = 21.3 |
| R24 = –28.88 | D24 = Variable | | |
| R25 = –26.19 | D25 = 0.90 | N14 = 1.77621 | ν14 = 49.6 |
| R26 = 29.28 | D26 = 3.70 | N15 = 1.81265 | ν15 = 25.4 |
| R27 = –786.13 | D27 = Variable | | |
| R28 = (Stop) | D28 = 2.30 | | |
| R29 = –369.12 | D29 = 3.88 | N16 = 1.53532 | ν16 = 45.9 |
| R30 = –34.18 | D30 = 0.15 | | |
| R31 = 95.17 | D31 = 10.11 | N17 = 1.57392 | ν17 = 53.0 |
| R32 = –22.O1 | D32 = 1.50 | N18 = 1.88814 | ν18 = 40.8 |
| R33 = –57.56 | D33 = 14.00 | | |
| R34 = 63.62 | D34 = 6.20 | N19 = 1.50349 | ν19 = 56.4 |
| R35 = –241.89 | D35 = 0.15 | | |
| R36 = 88.50 | D36 = 6.90 | N20 = 1.50349 | ν20 = 56.4 |
| R37 = –68.21 | D37 = 0.15 | | |
| R38 = –172.36 | D38 = 1.75 | N21 = 1.88814 | ν21 = 40.8 |
| R39 = 34.18 | D39 = 9.40 | N22 = 1.50229 | ν22 = 66.0 |
| R40 = –52.47 | D40 = 0.15 | | |
| R41 = –261.12 | D41 = 1.60 | N23 = 1.83932 | ν23 = 37.2 |
| R42 = 28.10 | D42 = 8.70 | N24 = 1.48915 | ν24 = 70.2 |
| R43 = –64.42 | D43 = 0.15 | | |
| R44 = 31.76 | D44 = 5.00 | N25 = 1.51356 | ν25 = 51.0 |
| R45 = ∞ | D45 = 8.27 | | |
| R46 = ∞ | D46 = 55.50 | N26 = 1.51825 | ν26 = 64.2 |
| R47 = ∞ | | | |

| Variable Separation | Focal Length | | |
|---|---|---|---|
| | 5.82 | 16.47 | 46.58 |
| D17 | 1.59 | 24.39 | 36.96 |
| D24 | 37.46 | 11.57 | 2.08 |
| D27 | 3.76 | 6.85 | 3.76 |

| Variable Separation During Focusing | Infinity | Minimum (–175 mm from R1 vertex) β = –0.203 in Telephoto End |
|---|---|---|
| D8 | 1.90 | 12.134 |
| D10 | 11.70 | 1.466 |

| No. | B | C | D |
|---|---|---|---|
| 6 | –2.239 × 10$^{-7}$ | 4.607 × 10$^{-11}$ | 1.335 × 10$^{-13}$ |

Numerical Example 6:
f = 5.82 – 46.58   FNO = 1:1.64   Image Diagonal Length: 11.0

| | | | |
|---|---|---|---|
| R1 = 56.13 | D1 = 2.50 | N1 = 1.77621 | ν1 = 49.6 |
| R2 = 35.32 | D2 = 22.24 | | |
| R3 = 119.38 | D3 = 2.00 | N2 = 1.73234 | ν2 = 54.7 |
| R4 = 49.27 | D4 = 16.55 | | |
| *R5 = –106.69 | D5 = 2.00 | N3 = 1.60548 | ν3 = 60.7 |
| R6 = 174.14 | D6 = 0.20 | | |
| R7 = 80.08 | D7 = 6.20 | N4 = 1.81265 | ν4 = 25.4 |
| R8 = 253.23 | D8 = 1.70(∞) | | |
| R9 = 346.14 | D9 = 12.50 | N5 = 1.48915 | ν5 = 70.2 |
| *R10 = –68.67 | D10 = 11.40(∞) | | |
| R11 = 107.50 | D11 = 2.00 | N6 = 1.85501 | ν6 = 23.9 |
| R12 = 41.16 | D12 = 11.00 | N7 = 1.48915 | ν7 = 70.2 |
| R13 = –1555.49 | D13 = 0.20 | | |
| R14 = 75.19 | D14 = 7.50 | N8 = 1.50014 | ν8 = 65.0 |
| R15 = –421.18 | D15 = 0.20 | | |
| R16 = 61.85 | D16 = 7.00 | N9 = 1.73234 | ν9 = 54.7 |
| R17 = –2207.66 | D17 = Variable | | |
| R18 = 61.10 | D18 = 1.00 | N10 = 1.88814 | ν10 = 40.8 |
| R19 = 18.76 | D19 = 3.80 | | |
| R20 = –63.98 | D20 = 0.80 | N11 = 1.80811 | ν11 = 46.6 |
| R21 = 82.33 | D21 = 3.76 | | |
| R22 = –16.14 | D22 = 0.80 | N12 = 1.77621 | ν12 = 49.6 |
| R23 = 307.48 | D23 = 3.20 | N13 = 1.93306 | ν13 = 21.3 |
| R24 = –28.88 | D24 = Variable | | |
| R25 = –26.19 | D25 = 0.90 | N14 = 1.77621 | ν14 = 49.6 |
| R26 = 29.28 | D26 = 3.70 | N15 = 1.81265 | ν15 = 25.4 |
| R27 = –786.13 | D27 = Variable | | |
| R28 = (Stop) | D28 = 2.30 | | |
| R29 = –369.12 | D29 = 3.88 | N16 = 1.53532 | ν16 = 45.9 |
| R30 = –34.18 | D30 = 0.15 | | |
| R31 = 95.17 | D31 = 10.11 | N17 = 1.57392 | ν17 = 53.0 |
| R32 = –22.01 | D32 = 1.50 | N18 = 1.88814 | ν18 = 40.8 |
| R33 = –57.56 | D33 = 14.00 | | |
| R34 = 63.62 | D34 = 6.20 | N19 = 1.50349 | ν19 = 56.4 |
| R35 = –241.89 | D35 = 0.15 | | |
| R36 = 88.50 | D36 = 6.90 | N20 = 1.50349 | ν20 = 56.4 |
| R37 = –68.21 | D37 = 0.15 | | |
| R38 = –172.36 | D38 = 1.75 | N21 = 1.88814 | ν21 = 40.8 |
| R39 = 34.18 | D39 = 9.40 | N22 = 1.50229 | ν22 = 66.0 |
| R40 = –52.47 | D40 = 0.15 | | |
| R41 = –261.12 | D41 = 1.60 | N23 = 1.83932 | ν23 = 37.2 |
| R42 = 28.10 | D42 = 8.70 | N24 = 1.48915 | ν24 = 70.2 |
| R43 = –64.42 | D43 = 0.15 | | |
| R44 = 31.76 | D44 = 5.00 | N25 = 1.51356 | ν25 = 51.0 |
| R45 = ∞ | D45 = 8.27 | | |
| R46 = ∞ | D46 = 55.50 | N26 = 1.51825 | ν26 = 64.2 |
| R47 = ∞ | | | |

| Variable Separation | Focal Length | | |
|---|---|---|---|
| | 5.82 | 16.47 | 46.58 |
| D17 | 1.35 | 24.14 | 36.72 |
| D24 | 37.46 | 11.57 | 2.08 |
| D27 | 3.76 | 6.85 | 3.76 |

| Variable Separation During Focusing | Infinity | Minimum (–172 mm from R1 vertex) β = –0.202 in Telephoto End |
|---|---|---|
| D8 | 1.70 | 12.22 |
| D10 | 11.40 | 0.88 |

| No. | B | C | D |
|---|---|---|---|
| 5 | 8.735 × 10$^{-7}$ | 8.551 × 10$^{-11}$ | –4.159 × 10$^{-13}$ |
| 10 | 3.079 × 10$^{-7}$ | –1.455 × 10$^{-10}$ | –1.538 × 10$^{-13}$ |

Numerical Example 7:
F = 8.67 – 152.6   FNO = 1:1.64 – 2.2   Image Diagonal Length: 11.0

| | | | |
|---|---|---|---|
| R1 = 686.89 | D1 = 4.33 | N1 = 1.60311 | ν1 = 60.7 |
| R2 = 311.91 | D2 = 15.14 | | |
| R3 = –176.42 | D3 = 3.97 | N2 = 1.77250 | ν2 = 49.6 |
| *R4 = 151.18 | D4 = 1.14(∞) | | |
| R5 = 139.38 | D5 = 28.05 | N3 = 1.58900 | ν3 = 48.6 |
| R6 = –141.29 | D6 = 0.20 | | |
| R7 = 437.83 | D7 = 3.62 | N4 = 1.75520 | ν4 = 27.5 |
| R8 = 64.78 | D8 = 13.45 | N5 = 1.50137 | ν5 = 56.4 |
| *R9 = 206.48 | D9 = 21.17(∞) | | |
| R10 = 136.07 | D10 = 14.06 | N6 = 1.48749 | ν6 = 70.2 |
| R11 = –482.39 | D11 = 0.20 | | |
| R12 = 195.60 | D12 = 11.32 | N7 = 1.48749 | ν7 = 70.2 |
| R13 = –384.31 | D13 = 0.20 | | |
| R14 = 125.69 | D14 = 10.27 | N8 = 1.48749 | ν8 = 70.2 |

-continued

| | | | |
|---|---|---|---|
| R15 = 701.45 | D15 = Variable | | |
| R16 = 82.78 | D16 = 1.93 | N9 = 1.77250 | ν9 = 49.6 |
| R17 = 34.07 | D17 = 7.88 | | |
| R18 = −2455.33 | D18 = 1.76 | N10 = 1.77250 | ν10 = 49.6 |
| R19 = 69.79 | D19 = 9.99 | | |
| R20 = −37.82 | D20 = 1.76 | N11 = 1.77250 | ν11 = 49.6 |
| R21 = 403.40 | D21 = 5.05 | N12 = 1.92286 | ν12 = 21.3 |
| R22 = −76.16 | D22 = Variable | | |
| R23 = −624.33 | D23 = 7.15 | N13 = 1.48749 | ν13 = 70.2 |
| R24 = −59.41 | D24 = 0.24 | | |
| R25 = 307.56 | D25 = 9.98 | N14 = 1.64000 | ν14 = 60.1 |
| R26 = −55.32 | D26 = 1.93 | N15 = 1.80518 | ν15 = 25.4 |
| R27 = −171.99 | D27 = 0.24 | | |
| R28 = 62.79 | D28 = 8.20 | N16 = 1.48749 | ν16 = 70.2 |
| R29 = −753.98 | D29 = Variable | | |
| R30 = (Stop) | D30 = 4.78 | | |
| R31 = −40.30 | D31 = 1.12 | N17 = 1.65160 | ν17 = 58.5 |
| R32 = 28.91 | D32 = 3.91 | N18 = 1.69895 | ν18 = 30.1 |
| R33 = 57.54 | D33 = 7.68 | | |
| R34 = −34.97 | D34 = 1.20 | N19 = 1.64000 | ν19 = 60.1 |
| R35 = −2819.61 | D35 = 7.00 | N20 = 1.68893 | ν20 = 31.1 |
| R36 = −32.02 | D36 = 27.27 | | |
| R37 = 118.25 | D37 = 9.89 | N21 = 1.48749 | ν21 = 70.2 |
| R38 = −33.37 | D38 = 1.76 | N22 = 1.75520 | ν22 = 27.5 |
| R39 = −44.42 | D39 = 0.16 | | |
| R40 = 205.06 | D40 = 1.52 | N23 = 1.75520 | ν23 = 27.5 |
| R41 = 31.65 | D41 = 7.84 | N24 = 1.51118 | ν24 = 51.0 |
| R42 = 322.67 | D42 = 0.88 | | |
| R43 = −51.05 | D43 = 4.65 | N25 = 1.48749 | ν25 = 70.2 |
| R44 = ∞ | D44 = 6.65 | | |
| R45 = ∞ | D46 = 55.50 | N26 = 1.51633 | ν26 = 64.2 |
| R46 = ∞ | | | |

| Variable | Focal Length | | |
|---|---|---|---|
| Separation | 8.67 | 32.19 | 152.60 |
| D15 | 0.57 | 58.63 | 90.07 |
| D22 | 137.67 | 64.82 | 1.45 |
| D29 | 1.20 | 15.97 | 47.91 |

| Variable Separation During Focusing | Infinity | Minimum (−660 mm from R1 vertex) β = −0.208 in Telephoto End | |
|---|---|---|---|
| D4 | 1.14 | 19.908 | |
| D9 | 21.17 | 2.402 | |

| No. | B | C | D |
|---|---|---|---|
| 4 | −7.604 × 10⁻⁸ | 6.623 × 10⁻¹² | 2.369 × 10⁻¹⁵ |
| 9 | 3.034 × 10⁻⁸ | −1.021 × 10⁻¹¹ | −1.263 × 10⁻¹⁵ |

TABLE 2

| | Numerical Example | | |
|---|---|---|---|
| Condition | 5 | 6 | 7 |
| (10) Z | 8 | 8 | 17.6 |
| (11) fw/IS | 0.53 | 0.53 | 0.79 |
| (12) βT$_{MOD}$ | −0.203 | −0.202 | −0.208 |
| (13) \|f11\|/f1 | 1.317 | 1.40 | 0.80 |
| (14) f12/f1 | 3.90 | 3.48 | 2.10 |
| (15) N11$_N$ | 1.776 | 1.776 | 1.603 |
| | 1.732 | 1.732 | 1.773 |
| | 1.605 | 1.605 | |
| (16) N12$_P$ | 1.489 | 1.489 | 1.589 |
| | | | 1.501 |

According to the invention, the rules of design are set forth as described above. With the use of part of the first lens unit for focusing of the 4-unit zoom lens, or a lens subunit, in focusing, or the use of the inner focus type, the maximum image angle and the zooming range are greatly increased. Along this, while the size of the entire lens system is minimized and the minimum object distance is shortened, the variation of aberrations with focusing is well corrected, particularly in the telephoto end. Hence, a zoom lens having a high optical performance over the entire focusing range can be achieved.

What is claimed is:

1. A zoom lens comprising, from front to rear, a first lens unit of positive refractive power, a second lens unit of negative refractive power for zooming, a third lens unit for compensating for the image shift with zooming, and a fourth lens unit having an image forming function, wherein said first lens unit has a front lens subunit of negative refractive power, a middle lens subunit of positive refractive power movable for focusing and a rear lens subunit of positive refractive power, satisfying the following conditions:

$$8 \leq z$$

$$0.53 \leq fw/IS \leq 0.79$$

where fw is the shortest focal length of the entire system, Z is the zoom ratio, and IS is the effective image size.

2. A zoom lens according to claim 1, satisfying the following condition:

$$\beta T_{MOD} \leq -0.2$$

where $\beta T_{MOD}$ is the image magnification of an object at the minimum distance in the telephoto end.

3. A zoom lens according to claim 1, wherein said front lens subunit includes a negative lens, and said middle lens subunit includes a positive lens, said zoom lens satisfying the following conditions:

$$0.8 \leq |f11|/f1 \leq 1.4$$

$$2.1 \leq f12/f1 \leq 3.9$$

$$1.6 \leq N11_N$$

$$N12_p \leq 1.59$$

where f1 is the focal length of said first lens unit, f11 and f12 are the focal lengths of said front lens subunit and said middle lens subunit, respectively, $N11_N$ is the refractive index of a material of said negative lens of said front lens subunit, and $N12_p$ is the refractive index of a material of said positive lens of said middle lens subunit.

4. A zoom lens according to claim 1, wherein said front lens subunit and said rear lens subunit are fixed.

* * * * *

UNITED STATES PATENT AND TRADEMARK OFFICE
CERTIFICATE OF CORRECTION

PATENT NO. : 5,986,820

DATED : November 16, 1999

INVENTOR(S) : USUI, et al.  Page 1 of 3

It is certified that error appears in the above-identified patent and that said Letters Patent is hereby corrected as shown below:

COLUMN 3:
Line 2, "of" should be deleted.
Line 9, "rearer" should read --rear--.

COLUMN 5:
Line 20, "so called" should read --so-called--.

COLUMN 6:
Line 25, "case to," should read --case, to--.
Line 60, "extracts" should read --produces--.

COLUMN 7:
Line 3, "Still" should begin a new paragraph.

COLUMN 8:
Line 30, "respectively" should read --respectively,--.
Line 31, "conditions," should read --conditions--.
Line 44, "respectively" should read --respectively,--.
Line 45, "conditions," should read --conditions--.

COLUMN 9:
Line 3, "elements" should read --element--.

UNITED STATES PATENT AND TRADEMARK OFFICE
CERTIFICATE OF CORRECTION

PATENT NO. : 5,986,820

DATED : November 16, 1999

INVENTOR(S) : USUI, et al.

It is certified that error appears in the above-identified patent and that said Letters Patent is hereby corrected as shown below:

COLUMN 15:
 Lines 26-29 should read as follows:

--

Table-1

| Condition | Numerical Example | | | |
|---|---|---|---|---|
| | 1 | 2 | 3 | 4 |

--.

COLUMN 16:
 Line 26, "$\nu\Delta X=59.7.$" should read --$\Delta\nu X=59.7.$--.

COLUMN 18:
 Line 29, "subunit" should read --subunit F11-- .
 Line 62, "largely" should read --greatly--.

COLUMN 19:
 Line 63, "(variator), V" should read --(variator) V--.

COLUMN 21:
 Line 30, "R32=-22.01" should read --R32=-22.01--.
 Line 52, "8=-0.203" should read ---$\beta$=-0.203--.

UNITED STATES PATENT AND TRADEMARK OFFICE
CERTIFICATE OF CORRECTION

PATENT NO. : 5,986,820

DATED : November 16, 1999

INVENTOR(S) : USUI, et al.

Page 3 of 3

It is certified that error appears in the above-identified patent and that said Letters Patent is hereby corrected as shown below:

COLUMN 24:
Line 25, "$8 \leq z$" should read --$8 \leq Z$--.

Signed and Sealed this

Twenty-second Day of May, 2001

Attest:

NICHOLAS P. GODICI

Attesting Officer

Acting Director of the United States Patent and Trademark Office